United States Patent
Shin et al.

(10) Patent No.: US 10,712,878 B2
(45) Date of Patent: Jul. 14, 2020

(54) TOUCH SENSOR INTEGRATED TYPE DISPLAY DEVICE

(71) Applicant: LG Display Co., Ltd., Seoul (KR)

(72) Inventors: Seungrok Shin, Go-yang-si (KR);
Deuksu Lee, Go-yang-si (KR);
Jaeseung Kim, Go-yang-si (KR)

(73) Assignee: LG Display Co., Ltd., Seoul (KR)

( * ) Notice: Subject to any disclaimer, the term of this patent is extended or adjusted under 35 U.S.C. 154(b) by 112 days.

(21) Appl. No.: 15/615,434

(22) Filed: Jun. 6, 2017

(65) Prior Publication Data

US 2017/0269739 A1   Sep. 21, 2017

Related U.S. Application Data

(62) Division of application No. 14/925,782, filed on Oct. 28, 2015, now Pat. No. 9,703,439.

(30) Foreign Application Priority Data

Dec. 26, 2014   (KR) .................. 10-2014-0191141
Sep. 30, 2015   (KR) .................. 10-2015-0137874

(51) Int. Cl.
   *G06F 3/044*       (2006.01)
   *G06F 3/041*       (2006.01)
   *G06F 3/047*       (2006.01)

(52) U.S. Cl.
   CPC .............. *G06F 3/044* (2013.01); *G06F 3/047* (2013.01); *G06F 3/0412* (2013.01);
   (Continued)

(58) Field of Classification Search
   None
   See application file for complete search history.

(56) References Cited

U.S. PATENT DOCUMENTS

2009/0002336 A1   1/2009   Choi et al.
2009/0085891 A1*  4/2009   Yang .................. G06F 3/044
                                                                345/174
(Continued)

FOREIGN PATENT DOCUMENTS

CN   102541318 A   7/2012
CN   203224861 U   10/2013
(Continued)

OTHER PUBLICATIONS

European Examination Report, European Application No. 15192325.7, dated Jan. 20, 2017, 8 pages.
(Continued)

*Primary Examiner* — Christopher R Lamb
(74) *Attorney, Agent, or Firm* — Fenwick & West LLP

(57) ABSTRACT

Disclosed is a display device integrated with a touch sensor that may include a plurality of gate lines and a plurality data lines crossing each other; a plurality of pixel electrodes between the data lines; a plurality of touch/common electrodes arranged in a first direction and a second direction that cross each other, each of the plurality of touch/common electrodes overlapping at least one pixel electrode; 1-1 routing wires connected to 1-1 touch/common electrodes; 1-2 routing wires connected to 1-2 touch/common electrodes; 2-1 routing wires connected to 2-1 touch/common electrodes; and 2-2 routing wires connected to 2-2 touch/common electrodes.

9 Claims, 15 Drawing Sheets

(52) U.S. Cl.
CPC .. *G06F 3/0416* (2013.01); *G06F 2203/04103* (2013.01); *G06F 2203/04111* (2013.01)

(56) References Cited

U.S. PATENT DOCUMENTS

| | | | |
|---|---|---|---|
| 2012/0218199 | A1 | 8/2012 | Kim et al. |
| 2013/0215082 | A1* | 8/2013 | Mi .................... G06F 3/044 345/174 |
| 2013/0257794 | A1 | 10/2013 | Lee et al. |
| 2013/0314335 | A1* | 11/2013 | Kang ................ G06F 3/0416 345/173 |
| 2013/0321296 | A1 | 12/2013 | Lee et al. |
| 2014/0132526 | A1 | 5/2014 | Lee |
| 2014/0145971 | A1 | 5/2014 | Lin |
| 2014/0184559 | A1 | 7/2014 | Han et al. |
| 2014/0240279 | A1 | 8/2014 | Hwang |
| 2014/0306916 | A1* | 10/2014 | Wang .................. G06F 3/041 345/173 |
| 2014/0362031 | A1 | 12/2014 | Mo et al. |
| 2015/0091843 | A1 | 4/2015 | Ludden |
| 2016/0041666 | A1 | 2/2016 | Lee et al. |

FOREIGN PATENT DOCUMENTS

| | | |
|---|---|---|
| CN | 203224861 U | 8/2014 |
| EP | 2985681 A1 | 2/2016 |
| JP | H09-179679 A | 7/1997 |
| JP | 2007-018515 A | 1/2007 |
| JP | 2010-181747 A | 8/2010 |
| JP | 2010-191504 A | 9/2010 |
| JP | 2014-115647 A | 6/2014 |
| KR | 10-2010-0095400 A | 8/2010 |
| KR | 10-1009925 B1 | 1/2011 |
| KR | 10-2013-0072591 A | 7/2013 |
| KR | 10-2013-0116138 A | 10/2013 |
| KR | 10-2014-0064184 A | 5/2014 |
| TW | 201426457 | 9/2012 |
| TW | 201430670 | 7/2014 |

OTHER PUBLICATIONS

Japanese Office Action, Japanese Application No. 2015-247082, dated Nov. 10, 2016, 8 pages.
Taiwan First Office Action, Taiwan Application No. 104136082, dated Sep. 21, 2016, 11 pages.
European Extended Search Report, European Application No. 15192325.7, dated Mar. 1, 2016, 10 pages.
United States Office Action, U.S. Appl. No. 14/925,782, dated Oct. 26, 2016, 13 pages.
United States Office Action, U.S. Appl. No. 14/925,782, dated Jun. 7, 2016, 15 pages.

* cited by examiner

TOUCH SENSOR INTEGRATED TYPE DISPLAY DEVICE

CROSS REFERENCE TO RELATED APPLICATIONS

This application is a divisional of U.S. patent application Ser. No. 14/925,782 filed on Oct. 28, 2015, which claims the benefit of Republic of Korea Patent Application No. 10-2014-0191141 filed on Dec. 26, 2014 and Republic of Korea Patent Application No. 10-2015-0137874 filed on Sep. 30, 2015, all of which are hereby incorporated by reference for all purposes as if fully set forth herein.

BACKGROUND OF THE INVENTION

Field of the Invention

The present invention relates to a display device integrated with a touch sensor.

Discussion of the Related Art

In recent years, various flat panel display devices have been developed to meet the needs for appropriately displaying various types of multi-media. The development of flat panel display devices has been directed to achieving large screen, low manufacturing costs, and high qualities such as displaying moving images of high quality, high resolution, high brightness, high contrast ratio, and wide color reproduction range. Also, various input devices, such as a keyboard, a mouse, a track ball, a joystick, and a digitizer, have been used to allow a user to interface with flat panel display devices.

However, the user may become dissatisfied due to the need to learn how to use various types of input devices. Furthermore, these input devices occupy physical space. Thus, there has been an increased demand for a convenient and simple input device capable of reducing erroneous operations. In response to such a demand, a touch sensor has been proposed to enable the user to input desired information by directly touching a screen, or by approaching the screen with his or her hand or a pen while the user watches the display device.

The touch sensor may have a simple configuration capable of reducing erroneous operations. The user may be able to perform an input action without using a separate input device, and can quickly and easily operate the display device using the touch sensor while watching the contents displayed on the screen. Thus, such a touch sensor has been applied to various types of display devices.

Touch sensors may be classified into an add-on type touch sensor, an on-cell type touch sensor, and an integrated type (also referred to as in-cell type) touch sensor, depending on their structures. The add-on type touch sensor may be configured such that a display device and a touch panel including a touch sensor are individually manufactured, and then the touch panel may be attached to an upper substrate of the display device. The on-cell type touch sensor may be configured such that the touch sensor may be directly formed on the surface of an upper glass substrate of the display device. The integrated type touch sensor may be configured such that the touch sensor may be formed inside the display device to thereby achieve thin profile and increase durability of the display device.

The integrated type touch sensor has such advantages of thin profile and improved durability, because typically, the common electrodes of the display device also serve as the touch electrodes of the touch sensor. Due to these advantages over the add-on type and on-cell type touch sensors, the integrated type touch sensor has been recent focus of interest in display industry.

The integrated type touch sensor may be divided into an optical touch sensor and a capacitive touch sensor, depending on the method of sensing a touched portion. The capacitive touch sensor may be further divided into a self-capacitive touch sensor and a mutual capacitive touch sensor.

The self-capacitive touch sensor may have a plurality of independent patterns in a touch area of a touch sensing panel, and measure changes in capacitance of each independent pattern, thereby detecting whether or not a touch operation is performed. On the other hand, the mutual capacitive touch sensor may have X-axis direction electrode strings (for example, driving electrode strings) and Y-axis direction electrode strings (for example, sensing electrode strings) which cross each other in the touch area of the touch sensing panel in matrix, apply a driving pulse to the X-axis electrode strings, and sense changes in voltages generated in sensing nodes defined as the crossings of the X-axis direction electrode strings and the Y-axis direction electrode strings through the Y-axis direction electrode strings, thereby detecting whether or not a touch operation is performed.

However, in the mutual capacitive touch sensor, a mutual capacitance between the X-axis direction electrode strings and the Y-axis direction electrode strings is small, but parasitic capacitance generated in the X-axis direction electrode strings and the Y-axis direction electrode strings by the data lines and the gate lines arranged in the display device is large. As a result, it may be difficult to detect with precision touched positions.

Also, the mutual capacitive touch sensor has a complicated construction of routing wires, because touch driving routing wires are connected to touch driving electrode strings (for example, the X-axis direction electrode strings) and because touch sensing routing wires are connected to touch sensing electrode strings (for example, the Y-axis direction electrode strings) for multi-touch operation.

For these reasons, the self-capacitive touch sensor, which has a simple construction of routing wires and high touch sensibility, has been widely used.

Hereinafter, a display device integrated with a self-capacitive touch sensor (hereinafter, simply referred to as "touch sensor integrated type display device") according to the related art will be described with reference to FIG. 1. The display device may be a liquid crystal display device, although it may also be an organic light emitting display device or other types of display devices.

FIG. 1 is a planar view illustrating a touch sensor integrated type liquid crystal display according to the related art.

As illustrated in FIG. 1, the touch sensor integrated display device includes an active area AA, in which touch/common electrodes are arranged and data are displayed, and a bezel area BA outside the active area AA. The bezel area BA has various wires including routing wires for driving and sensing touch electrodes and an integrated circuit (10) for driving a source driver.

The active area AA includes a plurality of touch/common electrodes Tx11 to Tx14, Tx21 to Tx24, Tx31 to Tx34, Tx41 to Tx44 and Tx51 to Tx54, and a plurality of routing wires TW11 to TW14, TW 21 to TW24, TW31 to TW34, TW 41 to TW44 and TW51 to TW54 connected to the plurality of touch/common electrodes Tx11 to Tx14, Tx21 to Tx24, Tx31 to Tx34, Tx41 to Tx44 and Tx51 to Tx54, respectively. The plurality of touch/common electrodes Tx11 to Tx14, Tx21 to Tx24, Tx31 to Tx34, Tx41 to Tx44 and Tx51 to Tx54 are divided in a first direction (e.g., x-axis direction) and a second direction (e.g., y-axis direction) which cross to each other. The plurality of routing wires TW11 to TW14, TW 21 to TW24, TW31 to TW34, TW 41 to TW44 and TW51 to TW54 are arranged in parallel to each other along the second direction.

The plurality of touch/common electrodes Tx11 to Tx14, Tx21 to Tx24, Tx31 to Tx34, Tx41 to Tx44 and Tx51 are formed by dividing common electrodes of the display device. The plurality of touch/common electrodes Tx11 to Tx14, Tx21 to Tx24, Tx31 to Tx34, Tx41 to Tx44 and Tx51 may function as common electrodes during a display mode for displaying image data, and function as touch electrodes during a touch mode for detecting touch locations.

The integrated circuit 10 in the bezel area BA supplies image data to data lines in synchronization with driving of gate lines (not shown) of the display, and supplies a common voltage to the touch/common electrodes Tx11 to Tx14, Tx21 to Tx24, Tx31 to Tx34, Tx41 to Tx44 and Tx51 during the display mode. Also, the integrated circuit 10 supplies a touch driving voltage to the touch/common electrodes Tx11 to Tx14, Tx21 to Tx24, Tx31 to Tx34, Tx41 to Tx44 and Tx51 to Tx54 during the touch mode, and detects a touch location by scanning changes of touch/common electrodes before and after the touch is performed.

The touch sensor integrated display device includes various wires, for example, the routing wires TW11 to TW14, TW 21 to TW24, TW31 to TW34, TW 41 to TW44 and TW51 to TW54 and the data lines (not shown) extended from the active area AA and connected to the integrated circuit 10.

The routing wires TW11 to TW14, TW 21 to TW24, TW31 to TW34, TW 41 to TW44 and TW51 to TW54 are connected to the touch/common electrodes Tx11 to Tx14, Tx21 to Tx24, Tx31 to Tx34, Tx41 to Tx44 and Tx51 to Tx54 on a one-to-one basis. As a result, as the size of the touch sensor integrated type display device increases, the number of the routing wires also increases, because each of the routing wires is connected to each of the touch/common electrodes.

For example, when a touch sensor integrated type display device having a size of 15.6 inch is constructed with one touch/common electrode on a pitch size of 4.3 mm×4.3 mm, the touch, 80 touch electrodes are arranged in the x-axis direction and 45 common electrodes are arranged in the y-axis direction, resulting in a total number of touch/common electrodes of 3,600. In such a case, the 3,600 touch/common electrodes are connected to the integrated circuit 10 through 3,600 routing wires. The routing wires have to be arranged to overlap the data lines to prevent reduction of the aperture ratio of the display device.

Thus, when the routing wires are arranged in only one direction, the size of the touch/common electrodes should be enlarged or there may be an occasion where some of touch/common electrodes are not connected to the routing wires, thereby to reduce touch sensibility.

SUMMARY OF THE INVENTION

Accordingly, the present invention is directed to a display device integrated with a touch sensor and method for manufacturing the same, which substantially obviates one or more problems due to limitations and disadvantages of the related art.

An advantage of the present invention is to provide a display device integrated with a touch sensor with an improved touch sensibility.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a display device integrated with a touch sensor may, for example, include a plurality of gate lines and a plurality data lines crossing each other; a plurality of pixel electrodes between the data lines; a plurality of touch/common electrodes arranged in a first direction and a second direction that cross each other, each of the plurality of touch/common electrodes overlapping at least one pixel electrode; 1-1 routing wires connected to 1-1 touch/common electrodes of the plurality of touch/common electrodes that are disposed at odd numbered rows of odd numbered columns, respectively, the 1-1 routing wires being arranged in substantially parallel with any the first direction; 1-2 routing wires connected to 1-2 touch/common electrodes of the plurality of touch/common electrodes that are disposed at the odd numbered rows of even numbered columns, respectively, the 1-2 routing wires being arranged in substantially parallel in the second direction; 2-1 routing wires connected to 2-1 touch/common electrodes of the plurality of touch/common electrodes that are disposed at even numbered rows of odd numbered columns, respectively, the 2-1 routing wires being arranged in substantially parallel in the second direction; and 2-2 routing wires connected to 2-2 touch/common electrodes of the plurality of touch/common electrodes that are disposed at even numbered rows of even numbered columns, respectively, the 2-2 routing wires being arranged in substantially parallel in the first direction.

In one embodiment, the 1-1 and 2-2 routing wires may overlap the plurality of gate lines in substantially parallel with the first direction and the 1-2 and 2-1 routing wires overlap the plurality of data lines that are in substantially parallel with the second direction. In another embodiment, the 1-1 and 2-2 routing wires overlap the plurality of data lines in substantially parallel with the first direction and the 1-2 and 2-1 routing wires overlap the plurality of gate lines that are in substantially parallel with the second direction.

The display device further comprises a plurality of thin film transistors, each thin film transistor being connected to one of the plurality of gate lines and one of the plurality of data lines, wherein the plurality of pixel electrodes are disposed on an insulation layer covering the plurality of thin film transistors, and connected to the plurality of thin film transistors, respectively, wherein the 1-2 and 2-1 routing wires are disposed in substantially parallel to each other on a first passivation layer covering the plurality of pixel electrodes, wherein the 1-1 and 2-2 routing wires are disposed in substantially parallel to each other on a second passivation layer covering the 1-2 and 2-1 routing wires, and the plurality of touch/common electrodes disposed on a third passivation layer covering the 1-1 and 2-2 routing wires.

Each of the 1-1 routing wires is connected to each of the 1-1 touch/common electrodes via a first contact hole passing through the third passivation layer, and each of the 2-2 routing wires is connected to each of the 2-2 touch/common electrodes via a second contact hole passing through the third passivation layer.

Each of the 1-2 routing wires is connected to each of the 1-2 touch/common electrodes via a third contact hole passing through the second and third passivation layers, and each of the 2-1 routing wires is connected to each of the 2-1 touch/common electrodes via a fourth contact hole passing through the second and third passivation layers.

The display device further comprises a plurality of thin film transistors, each thin film transistor being connected to one of the plurality of gate lines and one of the plurality of data lines, wherein the 1-1 and 2-2 routing wires are disposed on a layer on which the plurality of gate lines are disposed and arranged in substantially parallel with the plurality of gate lines, wherein the data lines are disposed on an gate insulation film covering the plurality of gate lines, the 1-1 and 2-2 routing wires which are disposed on a substrate, wherein each of the plurality of pixel electrodes are connected to a drain electrode of each of the plurality of thin film transistors which are disposed on a layer on which the plurality of data lines are disposed, wherein the 1-2 and 2-1 routing wires are disposed in substantially parallel to each other on a first passivation layer covering the plurality of pixel electrodes, and wherein the plurality of touch/common electrodes are disposed on a second passivation layer covering the 1-2 and 2-1 routing wires.

Each of the 1-1 touch/common electrodes is connected to each of the 1-1 routing wires via a first contact hole exposing the 1-1 routing wire, and each of the 2-2 touch/common electrodes is connected to each of the 2-2 routing wires via a second contact hole exposing the 2-2 routing wire.

Each of the 1-2 touch/common electrodes is connected to each of the 1-2 routing wires via a third contact hole passing through the second passivation layer, and each of the 2-1 touch/common electrodes is connected to each of the 2-1 routing wires via a fourth contact hole passing through the second passivation layer.

A common voltage is supplied to the plurality of touch/common electrodes during a display operation period, and a touch driving voltage is supplied to the plurality of touch/common electrodes, the plurality of gate lines and the plurality of data lines during a touch operation period.

During the display operation period, the common voltage is supplied to the touch/common electrodes through a first multiplexer, a gate high voltage is sequentially supplied to the gate lines through second multiplexers, and data voltages are supplied to the data lines through third multiplexers, and a gate low voltage is supplied to the gate lines when the gate high voltage is not supplied.

During the touch operation period, the touch driving voltage is supplied to the touch/common electrodes through the first multiplexer, to the gate lines through the second multiplexers, and to the data lines through the third multiplexers.

To achieve these and other advantages and in accordance with the purpose of the present invention, as embodied and broadly described, another display device integrated with a touch sensor comprises a plurality of gate lines and a plurality data lines crossing each other; a plurality of pixel electrodes between the data lines; a plurality of touch/common electrodes, each of the plurality of touch/common electrodes overlapping at least one pixel electrode; a first group of routing wires connected to a first subset of the touch/common electrodes and arranged in a first direction from the first subset of the touch/common electrodes; and a second group of routing wires connected to a second subset of the touch/common electrodes and arranged in a second direction from the second subset of the touch/common electrodes.

In some embodiments, lengths of the first group of routing wires are the same, and lengths of the second group of routing wires are the same.

In some embodiments, the first direction is the same as an arrangement direction of the gate lines, and the second direction is the same as an arrangement direction of the data lines.

In other embodiments, the first direction is the same as an arrangement direction of the data lines, and the second direction is the same as an arrangement direction of the gate lines.

In some embodiments, the first and second subset of touch/common electrodes alternate with each other to complete a row of touch common electrodes in the first direction.

In other embodiments, the first and second subset of touch/common electrodes alternate with each other to complete a column of touch common electrodes in the second direction.

The display device further comprises a first drive IC connected to the first group of routing wires; and a second drive IC connected to the second group of routing wires.

The first drive IC supplies a common voltage to the first subset of the touch/common electrodes during a display operation period of one frame period, and supplies a touch driving voltage to the first subset of the touch/common electrodes during a touch operation period of the one frame period, and the second drive IC supplies the common voltage to the second subset of the touch/common electrodes during the display operation period, and supplies the touch driving voltage to the second subset of the touch/common electrodes during the touch operation period, and during the touch operation period, a first voltage having a phase and an amplitude same to those of the touch driving voltage is supplied to the gate lines and a second voltage having a phase and an amplitude same to those of the touch driving voltage is supplied to the data lines.

To achieve these and other advantages and in accordance with the purpose of the present invention, as embodied and broadly described, another display device integrated with a touch sensor comprises a plurality of gate lines and a plurality data lines crossing each other; a plurality of pixel electrodes between the data lines; a plurality of touch/common electrodes, each of the plurality of touch/common electrodes overlapping at least one pixel electrode; a first group of routing wires connected to a first subset of the touch/common electrodes and arranged in a first direction from the first subset of the touch/common electrodes; a second group of routing wires connected to a second subset of the touch/common electrodes and arranged in a second direction from the second subset of the touch/common electrodes; a third group of routing wires connected to a third subset of the touch/common electrodes and arranged in a third direction from the third subset of the touch/common electrodes; and a fourth group of routing wires connected to a fourth subset of the touch/common electrodes and arranged in the second direction from the fourth subset of the touch/common electrodes.

In other embodiments, the display device further comprises a fifth group of routing wires connected to a fifth subset of the touch/common electrodes and arranged in the first direction from the fifth subset of the touch/common electrodes; a sixth group of routing wires connected to a sixth subset of the touch/common electrodes and arranged in a fourth direction from the sixth subset of the touch/common electrodes; a seventh group of routing wires connected to a seventh subset of the touch/common electrodes and arranged in the third direction from the seventh subset of the touch/ common electrodes; and a eighth group of routing wires connected to a eighth subset of the touch/common electrodes and arranged in the fourth direction from the eighth subset of the touch/common electrodes.

Lengths of routing wires belonging to the first group of routing wires are the same, lengths of routing wires belonging to the second group of routing wires are the same, lengths of routing wires belonging to the third group of routing wires are the same, lengths of routing wires belonging to the fourth group of routing wires are the same, lengths of routing wires belonging to the fifth group of routing wires are the same, lengths of routing wires belonging to the sixth group of routing wires are the same, lengths of routing wires belonging to the seventh group of routing wires are the same, and lengths of routing wires belonging to the eighth group of routing wires are the same.

In some embodiments, the first and third directions are the same as an arrangement direction of the gate lines, and the second and the fourth directions are the same as an arrangement direction of the data lines.

In other embodiments, the first and third directions are the same as an arrangement direction of the data lines, and the second and the fourth directions are the same as an arrangement direction of the gate lines.

The display device further comprises a first drive IC connected to the first group of routing wires; a second drive IC connected to the second group of routing wires; a third drive IC connected to the third group of routing wires; and a fourth drive IC connected to the fourth group of routing wires.

The first drive IC is configured to supply a common voltage to the first subset of the touch/common electrodes during a display operation period of one frame period, and supply a touch driving voltage to the first subset of the touch/common electrodes during a touch operation period of the one frame period, and the second drive IC is configured to supply the common voltage to the second subset of the touch/common electrodes during the display operation period, and supply the touch driving voltage to the second subset of the touch/common electrodes during the touch operation period, the third drive IC is configured to supply the common voltage to the third subset of the touch/common electrodes during the display operation period, and supply the touch driving voltage to the third subset of the touch/common electrodes during the touch operation period, and the fourth drive IC is configured to supply the common voltage to the fourth subset of the touch/common electrodes during the display operation period, and supply the touch driving voltage to the fourth subset of the touch/common electrodes during the touch operation period, and the display device is configured to, during the touch operation period, supply a first voltage having a phase and an amplitude same as those of the touch driving voltage to the gate lines and supply a second voltage having a phase and an amplitude same as those of the touch driving voltage to the data lines.

The display device further comprises a first drive IC connected to the first group of routing wires; a second drive IC connected to the second group of routing wires; a third drive IC connected to the third group of routing wires; a fourth drive IC connected to the fourth group of routing wires; a fifth drive IC connected to the fifth group of routing wires; a sixth drive IC connected to the sixth group of routing wires; a seventh drive IC connected to the seventh group of routing wires; and a eighth drive IC connected to the eighth group of routing wires.

The first drive IC is configured to supply a common voltage to the first subset of the touch/common electrodes during a display operation period of one frame period, and supply a touch driving voltage to the first subset of the touch/common electrodes during a touch operation period of the one frame period, and the second drive IC is configured to supply the common voltage to the second subset of the touch/common electrodes during the display operation period, and supply the touch driving voltage to the second subset of the touch/common electrodes during the touch operation period, the third drive IC is configured to supply the common voltage to the third subset of the touch/common electrodes during the display operation period, and supply a touch driving voltage to the third subset of the touch/common electrodes during the touch operation period, and the fourth drive IC is configured to supply the common voltage to the fourth subset of the touch/common electrodes during the display operation period, and supply the touch driving voltage to the fourth subset of the touch/common electrodes during the touch operation period, the fifth drive IC is configured to supply a common voltage to the fifth subset of the touch/common electrodes during the display operation period, and supply the touch driving voltage to the fifth subset of the touch/common electrodes during the touch operation period, and the sixth drive IC is configured to supply the common voltage to the sixth subset of the touch/common electrodes during the display operation period, and supply the touch driving voltage to the sixth subset of the touch/common electrodes during the touch operation period, the seventh drive IC is configured to supply the common voltage to the seventh subset of the touch/common electrodes during the display operation period, and supply the touch driving voltage to the seventh subset of the touch/common electrodes during the touch operation period, and the eighth drive IC is configured to supply the common voltage to the eighth subset of the touch/common electrodes during the display operation period, and supply the touch driving voltage to the eighth subset of the touch/common electrodes during the touch operation period, and the display device is configured to, during the touch operation period, supply a first voltage having a phase and an amplitude same as those of the touch driving voltage to the gate lines and supply a second voltage having a phase and an amplitude same as those of the touch driving voltage to the data lines.

According to the touch sensor integrated type display device, because the routing wires are arranged in, for example, both directions that crossing each other, it may be possible to reduce reduction of touch sensibility due to an enlargement of the touch/common electrode or some touch/common electrodes which are not connected to any routing wires.

Also, it may be possible to reduce parasitic capacitances generated between routing wires and gate lines and/or the routing wires and data lines by providing the same frequency and amplitude as the touch driving voltage supplied to the touch/common electrodes during a touch mode to the gate lines and data lines. That is, it may also be possible to reduce reduction of touch sensibility due to the parasitic capacitances.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to embodiments of the present invention, examples of which are illustrated in the accompanying drawings. Wherever possible, the same reference numbers may be used throughout the drawings to refer to the same or like parts.

In the following description, a liquid crystal display integrated with a self-capacitive touch sensor may be used as an example of a touch sensor integrated type display device, but the present invention is not limited thereto. For example, one of ordinary skill in the art would understand that the present invention can be applied to various types of display devices or other electronic devices. Hereinafter a display integrated with a self-capacitive touch sensor is simply referred to as a touch sensor integrated type display device.

Figure 1:
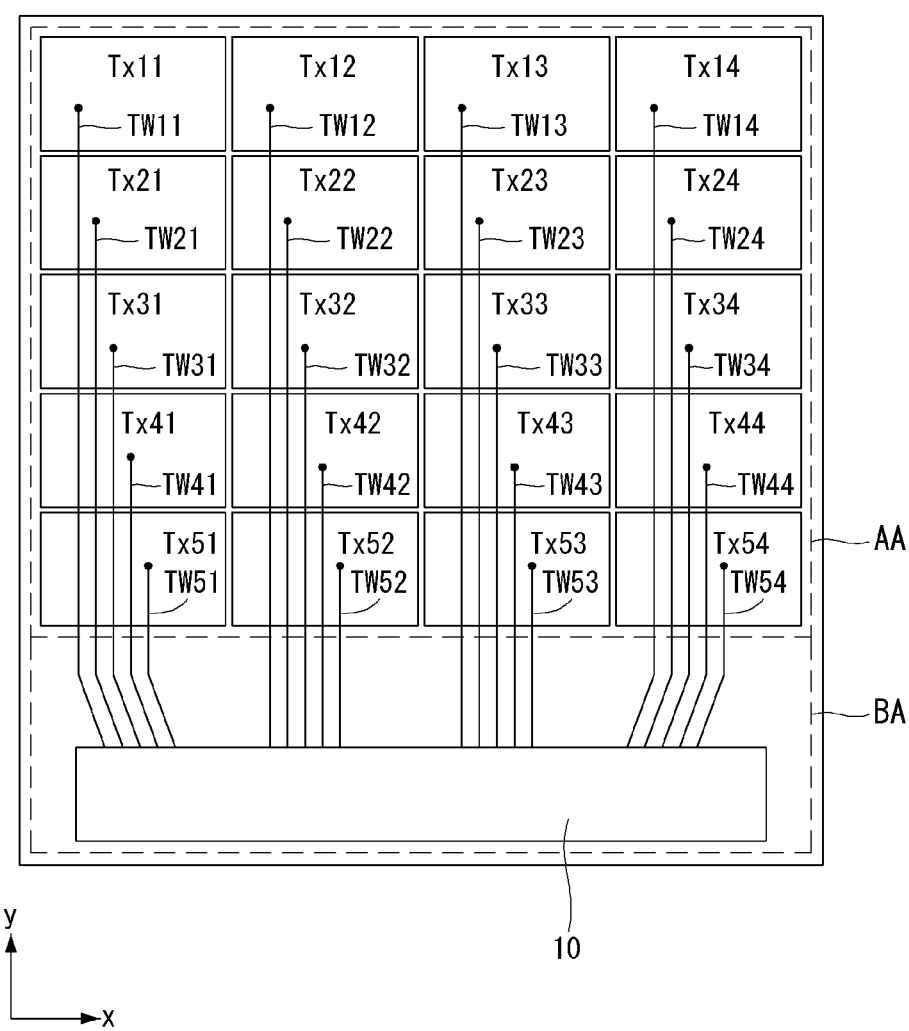
FIG. 1 is a planar view illustrating a touch sensor integrated type display device according to the related art.
Figure 2:
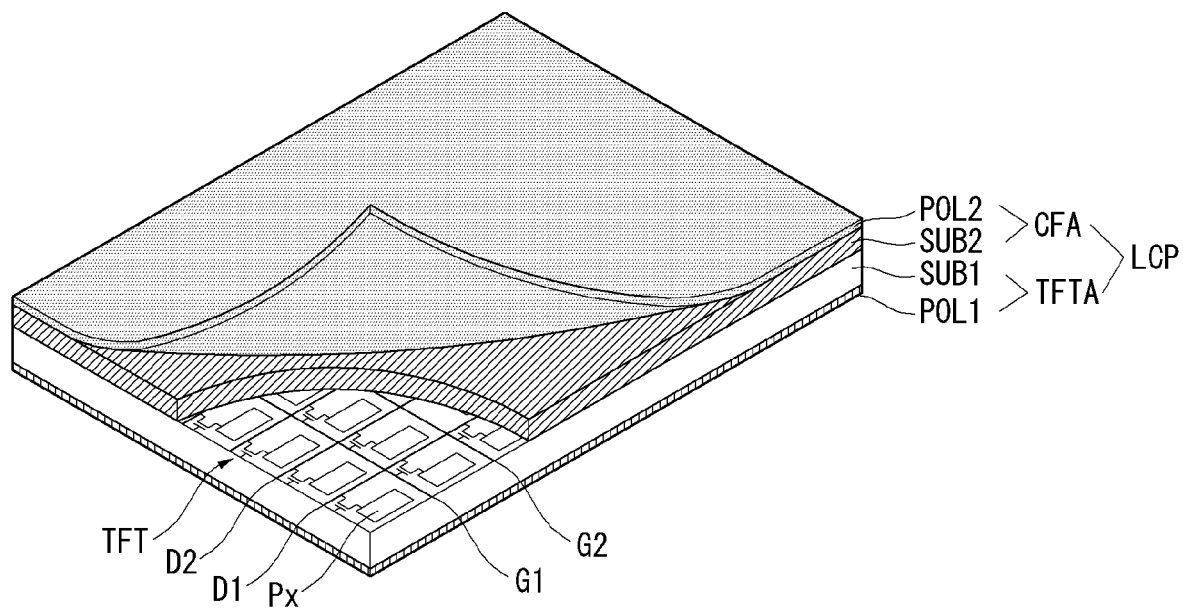
FIG. 2 is a partial exploded perspective view illustrating a touch sensor integrated type display device according to an embodiment of the present invention.
Figure 3:
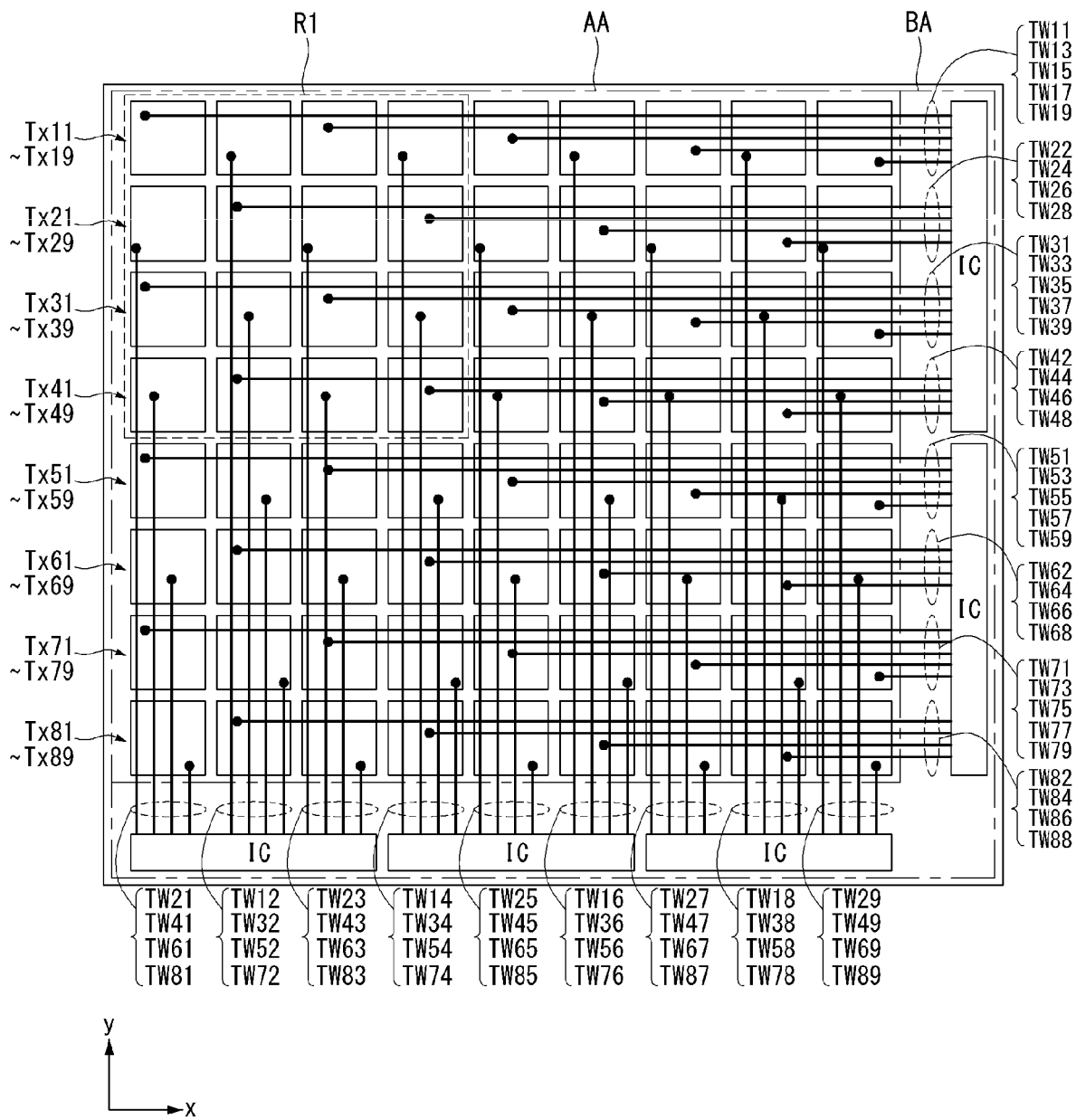
FIG. 3 is a planar view illustrating a relationship between touch/common electrodes and routing wires in a touch sensor integrated type display device according to the first embodiment of the invention.

A touch sensor integrated type display device according to an embodiment of the present invention is described with reference to FIGS. 2 and 3. In the embodiment of FIGS. 2 and 3, the display device is a liquid crystal display device.

FIG. 2 is a partial exploded perspective view illustrating a touch sensor integrated type display device according to an embodiment of the present invention, and FIG. 3 is a planar view illustrating a relationship between touch/common electrodes and routing wires in a touch sensor integrated type display device according to the first embodiment of the invention.

Referring to FIG. 2, the touch sensor integrated type display device includes a liquid crystal display panel LCP having a thin film transistor (TFT) array TFTA and a color filter array CFA that are facing each other, with a liquid crystal layer (not shown) interposed therebetween.

The TFT array TFTA includes a plurality of gate lines G1 and G2 (two gate lines G1 and G2 are shown, however the TFT array TFTA may include additional gate lines not shown) which may be arranged in parallel in a first direction (e.g., x-axis direction) on a first substrate SUB1, a plurality of data lines D1 and D2 (two data lines D1 and D2 are shown, however the TFTA array may include additional data lines not shown) which may be arranged in parallel in a second direction (e.g., y-axis direction) to cross the plurality of gate lines G1 and G2, thin film transistors TFT disposed at crossings of the gate lines G1 and G2 and the data lines D1 and D2, a plurality of pixel electrodes Px for charging data voltages to liquid crystal cells, and a plurality of touch/common electrodes (not shown) positioned opposite the plurality of pixel electrodes Px.

The color filter array CFA includes black matrixes (not shown) and color filters (not shown), which may be disposed on a second substrate SUB2. Polarizing plates POL1 and POL2 are respectively attached to external surfaces of the first substrate SUB1 and the second substrate SUB2 of the liquid crystal display panel LCP. Alignment layers (not shown) for setting a pre-tilt angle of the liquid crystal layer are respectively formed on inner surfaces of the first and second substrates SUB1 and SUB2. A plurality of column spacers are disposed between the TFT array TFTA and the color filter array CFA to maintain a cell gap of the liquid crystal display panel LCP.

The touch/common electrodes may be disposed on the second substrate SUB2 in a vertical electric field driving manner, such as a twisted nematic (TN) mode and a vertical alignment (VA) mode. Also, the touch/common electrodes may be disposed on the first substrate SUB1 along with the pixel electrodes Px in a horizontal electric field driving manner, such as an in-plane switching (IPS) mode and a fringe field switching (FFS) mode. In the following description, embodiments of the invention will be described based on the horizontal electric field driving manner by way of example.

Referring to FIG. 3, the touch sensor integrated display device according to the first embodiment of the invention includes an active area AA and a bezel area BA outside the active area AA. The active area AA is an area in which the touch/common electrodes are arranged and image data are displayed. The bezel area BA is an area in which various wires including routing wires extended from the active area AA for driving and sensing touch/common electrodes and display/touch controller ICs for driving source drivers and gate drivers are disposed.

The active area AA may include a plurality of touch/common electrodes Tx11 to Tx19, Tx21 to Tx29, Tx31 to Tx39, Tx41 to Tx49, Tx51 to Tx59, Tx61 to Tx69, Tx71 to Tx79, and Tx81 to Tx89. The plurality of touch/common electrodes Tx11 to Tx19, Tx21 to Tx29, Tx31 to Tx39, Tx41 to Tx49, Tx51 to Tx59, Tx61 to Tx69, Tx71 to Tx79, and Tx81 to Tx89 may be divided in a first direction (e.g., x-axis direction) and a second direction (e.g., y-axis direction) which cross each other.

The 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 disposed at the odd numbered rows of odd numbered columns among the plurality of touch/common electrodes are connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 arranged in a first direction (e.g., x-axis direction), respectively. That is, the 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 are connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79, respectively, on a one-to-one relationship.

The 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78 disposed at the odd numbered rows of even numbered columns among the plurality of touch/common electrodes are connected to 1-2 routing wires TW12, TW14, TW16, TW18; TW32, TW34, TW36, TW38; TW52, TW54, TW56, TW58; TW72, TW74, TW76, TW78 arranged in a second direction (e.g., y-axis direction), respectively. That is, the 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78 are connected to the 1-2 routing wires TW12, TW14, TW16, TW18; TW32, TW34, TW36, TW38; TW52, TW54, TW56, TW58; TW72, TW74, TW76, TW78, respectively, on a one-to-one relationship.

The 1-1 routing wires TW11, TW13, TW15, TW17, TW19; TW31, TW33, TW35, TW37, TW39; TW51, TW53, TW55, TW57, TW59; TW71, TW73, TW75, TW77, TW79 are arranged in parallel in the first direction, and 1-2 routing wires TW12, TW14, TW16, TW18; TW32, TW34, TW36, TW38; TW52, TW54, TW56, TW58; TW72, TW74, TW76, TW78 are arranged in parallel in the second direction.

The 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 disposed at the even numbered rows of odd numbered columns among the plurality of touch/common electrodes are connected to 2-1 routing wires TW21, TW23, TW25, TW27, TW29; TW41, TW43, TW45, TW47, TW49; TW61, TW63, TW65, TW67, TW69; TW81, TW83, TW85, TW87, TW89 arranged in the second direction (e.g., y-axis direction), respectively. That is, the 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 are connected to the 2-1 routing wires TW21, TW23, TW25, TW27, TW29; TW41, TW43, TW45, TW47, TW49; TW61, TW63, TW65, TW67, TW69; TW81, TW83, TW85, TW87, TW89, respectively, on a one-to-one relationship.

The 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 disposed at the even numbered rows of even numbered columns among the plurality of touch/common electrodes are connected to the 2-2 routing wires TW22, TW24, TW26, TW28; TW42, TW44, TW46, TW48; TW62, TW64, TW66, TW68; TW82, TW84, TW86, TW88 arranged in the second direction (e.g., y-axis direction), respectively. That is, the 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are connected to the 2-2 routing wires TW22, TW24, TW26, TW28; TW42, TW44, TW46, TW48; TW62, TW64, TW66, TW68; TW82, TW84, TW86, TW88, respectively, on a one-to-one relationship.

The 2-1 routing wires TW21, TW23, TW25, TW27, TW29; TW41, TW43, TW45, TW47, TW49; TW61, TW63, TW65, TW67, TW69; TW81, TW83, TW85, TW87, TW89 are arranged in parallel in the second direction, and the 2-2 routing wires TW22, TW24, TW26, TW28; TW42, TW44, TW46, TW48; TW62, TW64, TW66, TW68; TW82, TW84, TW86, TW88 are arranged in parallel in the first direction.

In the following description, an exemplary relationship between the touch/common electrodes and the pixel electrodes in the touch sensor integrated type display device according to the first embodiment of the present invention is described with reference to FIGS. 4 and 5.

Figure 4:
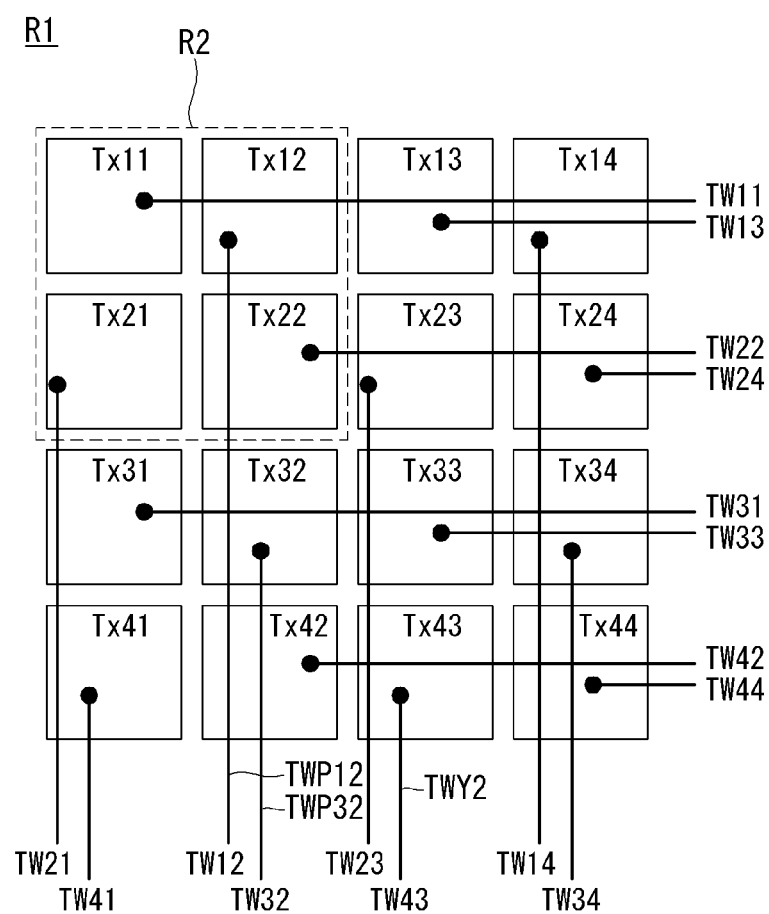
FIG. 4 is an enlarged planar view illustrating a region R1 shown in FIG. 3.
Figure 5:
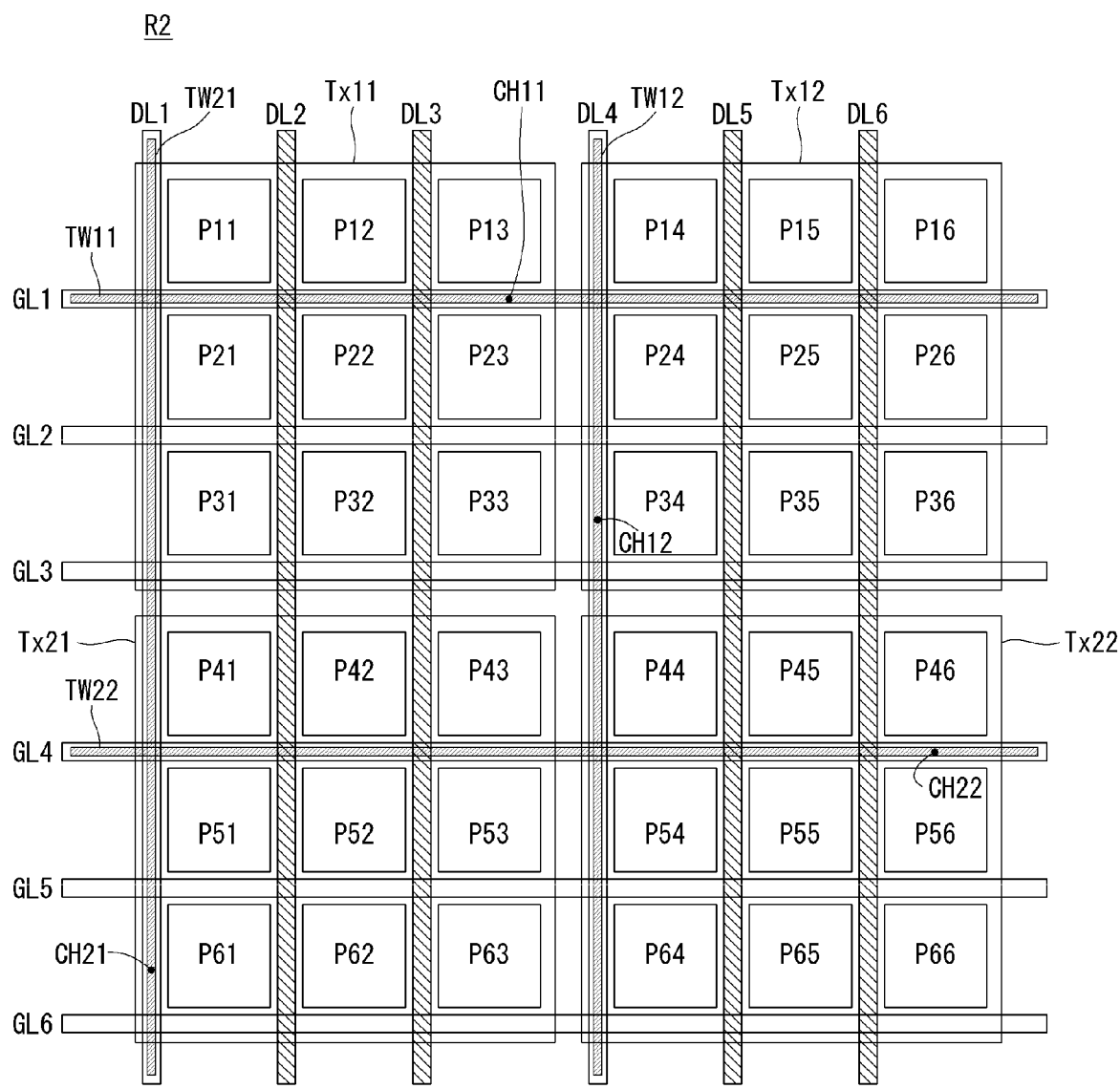
FIG. 5 is a planar view illustrating a relationship between touch/common electrodes and pixel electrodes in a region R2 shown in FIG. 4.

FIG. 4 is an enlarged planar view illustrating a region R1 shown in FIG. 3, and FIG. 5 is a planar view illustrating a relationship between touch/common electrodes and pixel electrodes in a region R2 shown in FIG. 4.

Referring to FIGS. 4 and 5, the touch sensor integrated type display device according to the first embodiment of the invention has a construction in which nine pixel electrodes, namely the nine pixel electrodes P11, P12, P13, P21, P22, P23, P31, P32, P33; namely the nine pixel electrodes P14, P15, P16, P24, P25, P26, P34, P35, P36; namely the nine pixel electrodes P41, P42, P43, P51, P52, P53, P61, P62, P63; namely the nine pixel electrodes P44, P45, P46, P54, P55, P56, P64, P65, P66 are in each case disposed in three rows and three columns to correspond to each of the touch/common electrodes Tx11, Tx12, Tx21 and Tx22. Each of the pixel electrodes P11 to P33, P14 to P36, P41 to P63 and P44 to P66 are respectively disposed in areas defined by crossings of the gate lines GL1 to GL6 and the data lines DL1 to DL 6.

The construction of the touch sensor integrated type display device according to the first embodiment of the invention illustrated in FIG. 5 discloses that the nine pixel electrodes are disposed in three rows and nine columns to correspond to each of the touch/common electrode Tx11, Tx12, Tx21 and Tx22, but the present invention is not limited thereto. It is possible to adjust the number of rows and columns disposed to correspond to one touch/common electrode depending on the user's need. Also, this embodiment discloses that the pixel electrodes are disposed in the crossing areas of gate lines GL1 to GL 6 and data lines DL1 to DL 6, but the present invention is not limited thereto. For example, the gate lines may be disposed to overlap the pixel electrodes.

In the following description, an exemplary connection relationship between the touch/common electrodes and the routing wires in the touch sensor integrated type display device according to the first embodiment of the present invention is described in detail with reference to FIGS. 6 to 7B.

Figure 6:
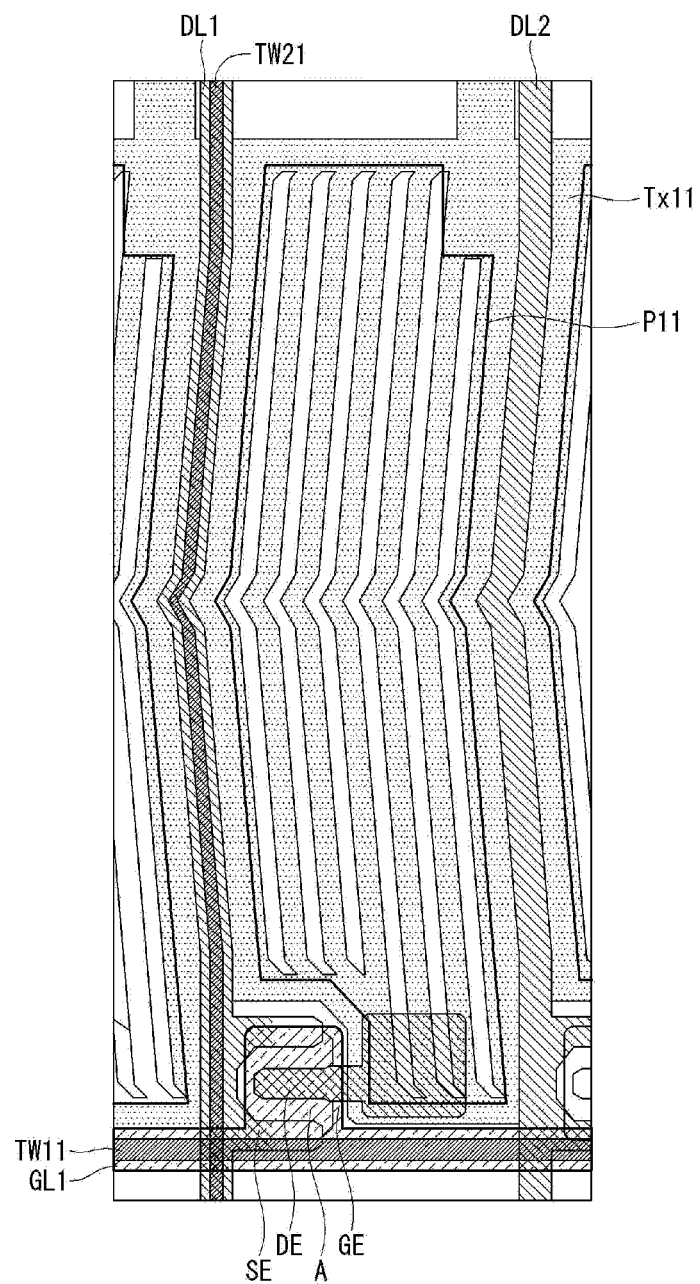
FIG. 6 is a planar view illustrating one example of one pixel area shown in FIG. 5, in which routing wires arranged in a first direction overlap gate lines and another routing wires arranged in a second direction overlap data lines.
Figure 7A:
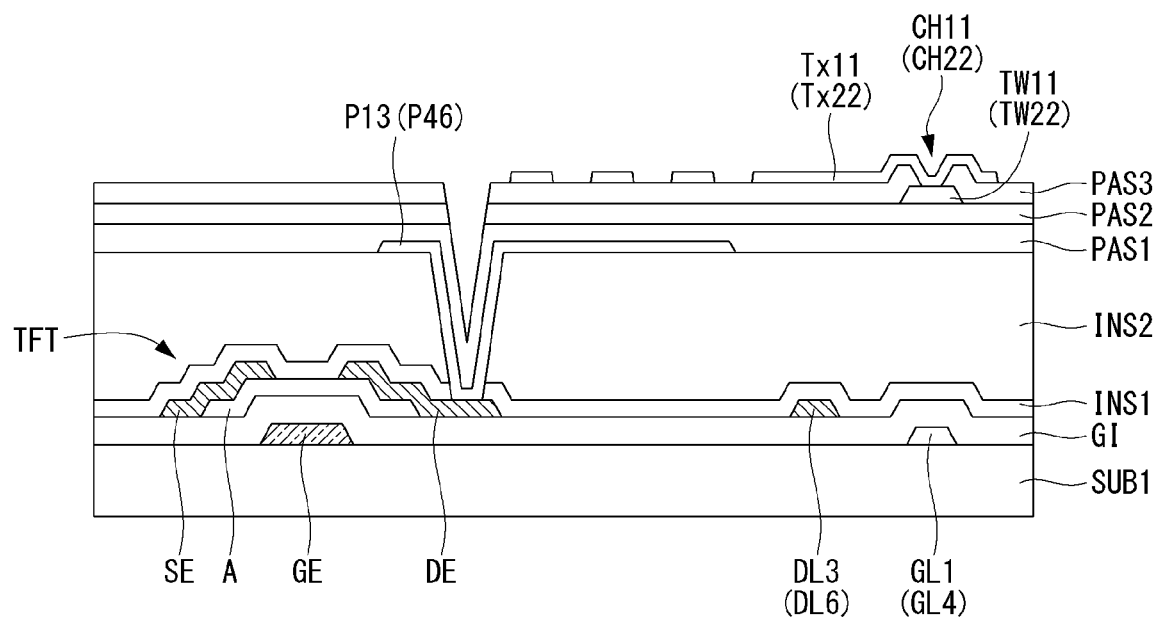
FIG. 7A is a cross-sectional view illustrating one example of a connection relationship between the routing wires arranged in a first direction and the touch/common electrodes connected to the routing wires in FIG. 6.

FIG. 6 is a planar view illustrating one example of one pixel area shown in FIG. 5, in which routing wires arranged in a first direction overlap gate lines, and another routing wires arranged in a second direction overlap data lines. FIG. 7A is a cross-sectional view illustrating one example of a connection relationship between the routing wires arranged in a first direction and the touch/common electrodes connected to the routing wires in FIG. 6. FIG. 7B is a cross-sectional view illustrating another example of a connection relationship between the other routing wires arranged in the second direction and the touch/common electrodes connected to the other routing wires in FIG. 6. In the following description, one pixel area is used to briefly describe the embodiment of the present invention.

Referring to FIGS. 5 to 7B, the touch sensor integrated type display device according to the first embodiment of the invention includes the gate lines GL1 to GL6 and the data lines DL1 and DL6 which cross each other on the first substrate SUB1, the thin film transistors TFT disposed at crossings of the gate lines GL1 to GL6 and the data lines DL1 and DL6, the pixel electrodes P11 to P66 respectively disposed in areas defined by the crossings of the gate lines GL1 to GL6 and the data lines DL1 and DL6, and the touch/common electrodes Tx11, Tx12, Tx21 and Tx22 positioned opposite the pixel electrodes P11-P33, P14-P36, P41-P63 and P44-P66. The touch/common electrodes Tx11, Tx12, Tx21 and Tx22 serve as common electrodes during a display operation period, and serve as touch electrodes during a touch operation period.

The gate lines GL1 to GL6 are arranged in parallel on the first substrate SUB1. A gate insulation film GI is disposed to cover the gate lines GL1 to GL6. An active layer A, a source electrode SE and a drain electrode DE are sequentially disposed on the gate insulation film GI to construct the thin film transistor TFT.

The thin film transistor TFT includes a gate electrode GE respectively extended from the gate lines GL1 to GL6, the active layer A disposed to face the gate electrode GE on the gate insulation film GI, and the source electrode SE and drain electrode DE separated from each other to expose a part of the active layer A on the gate insulation film GI. The source electrode SE may be respectively extended from the data lines DL1 to DL6.

By way of example, the first embodiment of the invention describes a thin film transistor having a gate bottom structure, in which the gate electrode is disposed under the source and drain electrodes, but the present invention is not limited to this example. One of ordinary skill in the art would understand that the present invention also covers, for example, a thin film transistor having a top gate structure, in which the gate electrode is disposed on the source and drain electrodes. Because a thin film transistor having the top gate structure is known, a detailed description thereof will be omitted.

A first insulation layer INS1 is disposed on the gate insulation film GI to cover the thin film transistor TFT and the data lines DL1 to DL6. A second insulation layer INS2 is disposed on the first insulation layer INS1 for planarization. The pixel electrodes P11 to P66 are disposed on the second insulation layer INS2. Each of the pixel electrodes P11 to P66 is connected to the drain electrode DE through a contact hole passing through the first and second insulation layer INS1 and INS2.

A first passivation layer PAS1 is disposed on the second insulation layer INS2 to cover the pixel electrodes P11 to P66. On the first passivation layer PAS1, the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 to be connected to the 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79, and the 2-2 routing wires TW22, TW24, TW26, TW28; TW42, TW44, TW46, TW48; TW62, TW64, TW66, TW68; TW82, TW84, TW86, TW88 to be connected to the 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are disposed in parallel in the first direction (e.g., x-axis direction).

A second passivation layer PAS2 is disposed on the first passivation layer PAS1, and the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 and the 2-2 routing wires TW22, TW24, TW26, TW28; TW42, TW44, TW46, TW48; TW62, TW64, TW66, TW68; TW82, TW84, TW86, TW88 are disposed on the second passivation layer PAS2. A third passivation layer PAS3 is disposed on the second passivation layer PAS2 to cover the 1-1 and 2-2 routing wires.

On the first passivation layer PAS1 and under the second passivation layer PAS2, the 1-2 routing wires TW12, TW14, TW16, TW18; TW32, TW34, TW36, TW38; TW52, TW54, TW56, TW58; TW72, TW74, TW76, TW78 to be connected to the 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78, and the 2-1 routing wires TW21, TW23, TW25, TW27, TW29; TW41, TW43, TW45, TW47, TW49; TW61, TW63, TW65, TW67, TW69; TW81, TW83, TW85, TW87, TW89 to be connected to the 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 are disposed in parallel in the second direction (e.g., y-axis direction).

A second passivation layer PAS2 is disposed on the first passivation layer PAS1 to cover the 1-2 routing wires TW12, TW14, TW16, TW18; TW32, TW34, TW36, TW38; TW52, TW54, TW56, TW58; TW72, TW74, TW76, TW78 and the 2-1 routing wires TW21, TW23, TW25, TW27, TW29; TW41, TW43, TW45, TW47, TW49; TW61, TW63, TW65, TW67, TW69; TW81, TW83, TW85, TW87, TW89.

On the third passivation layer PAS3, the touch/common electrodes Tx11 to Tx19, Tx21 to Tx29, Tx31 to Tx39, Tx41 to Tx49, Tx51 to Tx59, Tx61 to Tx69, Tx71 to Tx79, Tx81 to Tx89 shown in FIG. 3 are disposed.

The 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 are respectively connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 disposed on the second passivation layer PAS2 via first contact holes CH11 passing through the third passivation layer PAS3, as illustrated in FIGS. 3, 5 and 7A. The 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are respectively connected to the 2-2 routing wires TW22, TW24, TW26, TW28; TW42, TW44, TW46, TW48; TW62, TW64, TW66, TW68; TW82, TW84, TW86, TW88 disposed on the second passivation layer PAS2 via second contact holes CH22 passing through the third passivation layer PAS3, as illustrated in FIGS. 3, 5 and 7A.

The 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78 are respectively connected to the 1-2 routing wires TW12, TW14, TW16, TW18; TW32, TW34, TW36, TW38; TW52, TW54, TW56, TW58; TW72, TW74, TW76, TW78 disposed on the first passivation layer PAS1 via third contact holes CH12 passing through the second and third passivation layers PAS2 and PAS3, as illustrated in FIGS. 3, 5 and 7B. The 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 are respectively connected to the 2-1 routing wires TW21, TW23, TW25, TW27, TW29; TW41, TW43, TW45, TW47, TW49; TW61, TW63, TW65, TW67, TW69; TW81, TW83, TW85, TW87, TW89 disposed on the first passivation layer PAS1 via fourth contact holes CH21 passing through the second and third passivation PAS2 and PAS3, as illustrated in FIGS. 3, 5 and 7B.

In the following description, another example of a connection relationship between touch/common electrodes and the routing wires in the touch sensor integrated type display device according to the first embodiment of the invention is described in detail with reference to FIGS. 8 to 9B.

Figure 8:
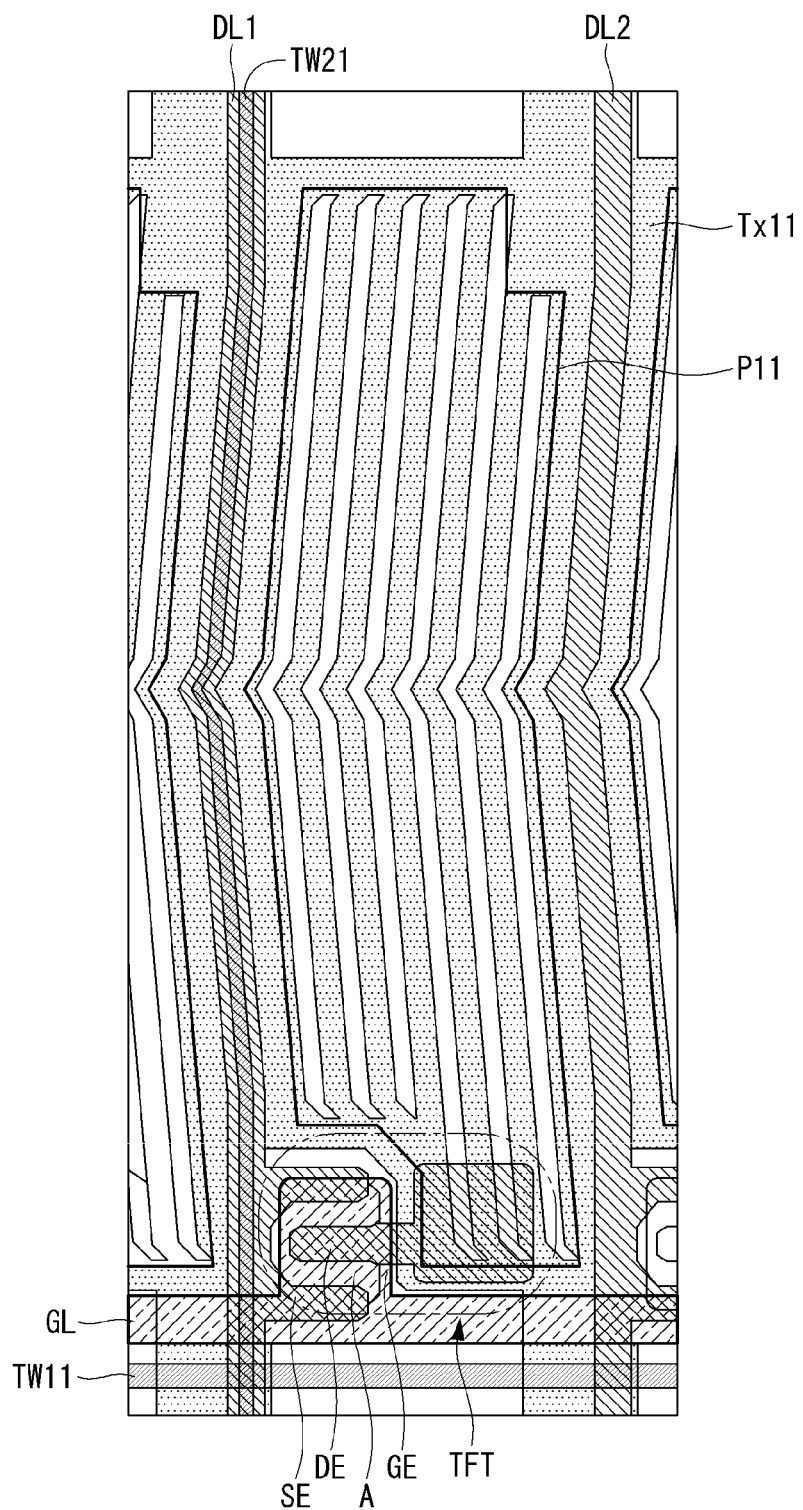
FIG. 8 is a planar view illustrating another example of one pixel area shown in FIG. 5, in which routing wires arranged in a first direction are not overlapped with gate lines but arranged in parallel with the gate lines.
Figure 9A:
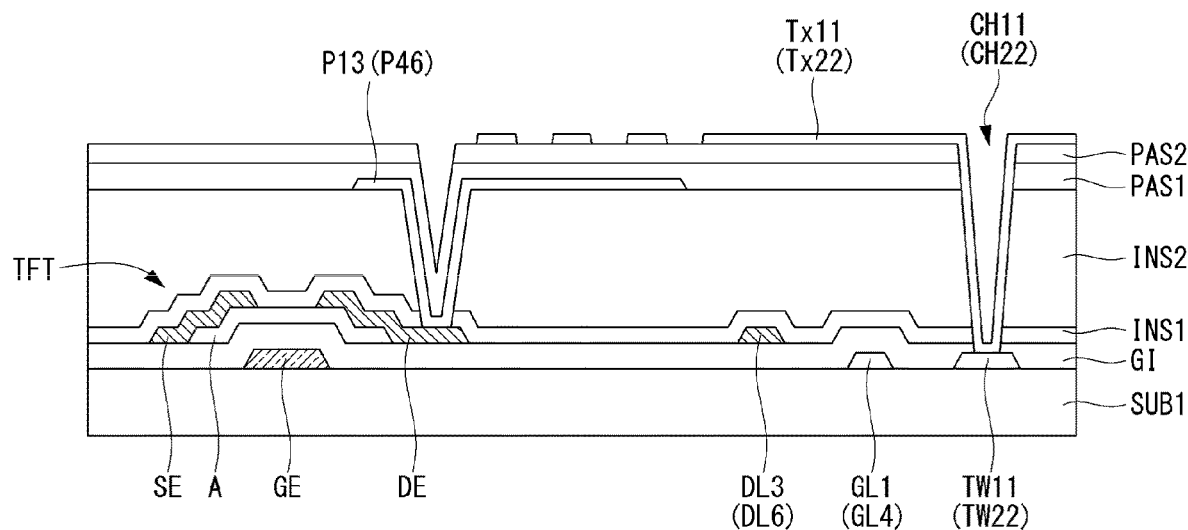
FIG. 9A is a cross-sectional view illustrating one example of a connection relationship between the routing wires arranged in a first direction and the touch/common electrodes connected to the routing wires in FIG. 8.

FIG. 8 is a planar view illustrating another example of one pixel area shown in FIG. 5, in which routing wires arranged in a first direction are not overlapped with gate lines but arranged in parallel with the gate lines. FIG. 9A is a cross-sectional view illustrating one example of a connection relationship between the routing wires arranged in a first direction and the touch/common electrodes connected to the routing wires in FIG. 8. FIG. 9B is a cross-sectional view illustrating another example of a connection relationship between other routing wires arranged in a second direction and the touch/common electrodes connected to the other routing wires in FIG. 8. In order to briefly describe the embodiment of the invention, one pixel area is illustrated.

Figure 7B:
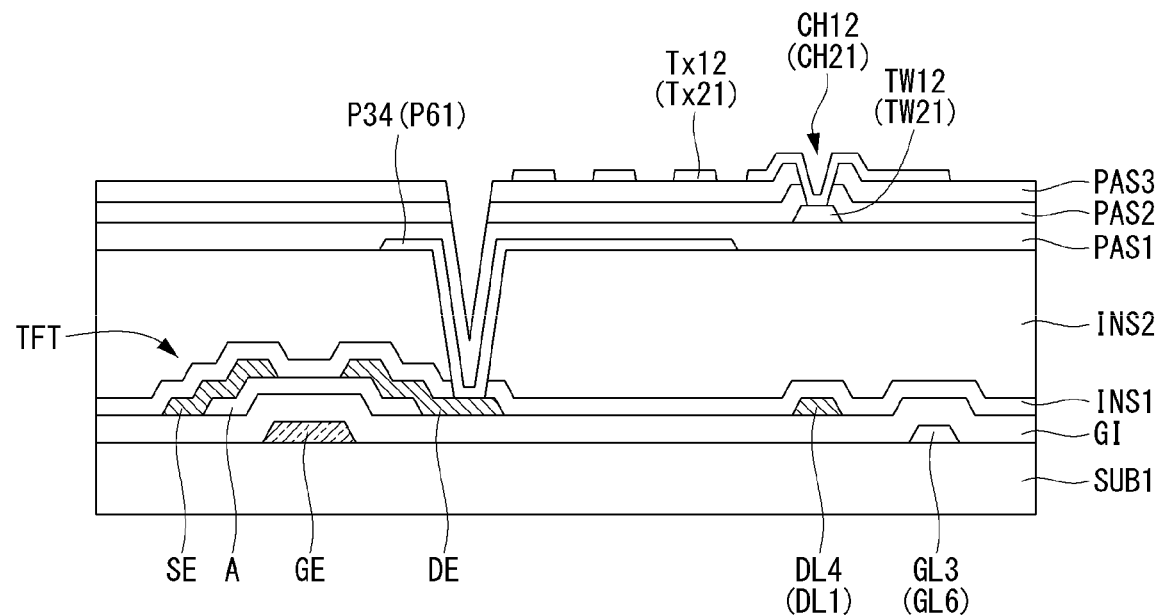
FIG. 7B is a cross-sectional view illustrating another example of a connection relationship between the another routing wires arranged in a second direction and the touch/common electrodes connected to the another routing wires in FIG. 6.
Figure 9B:
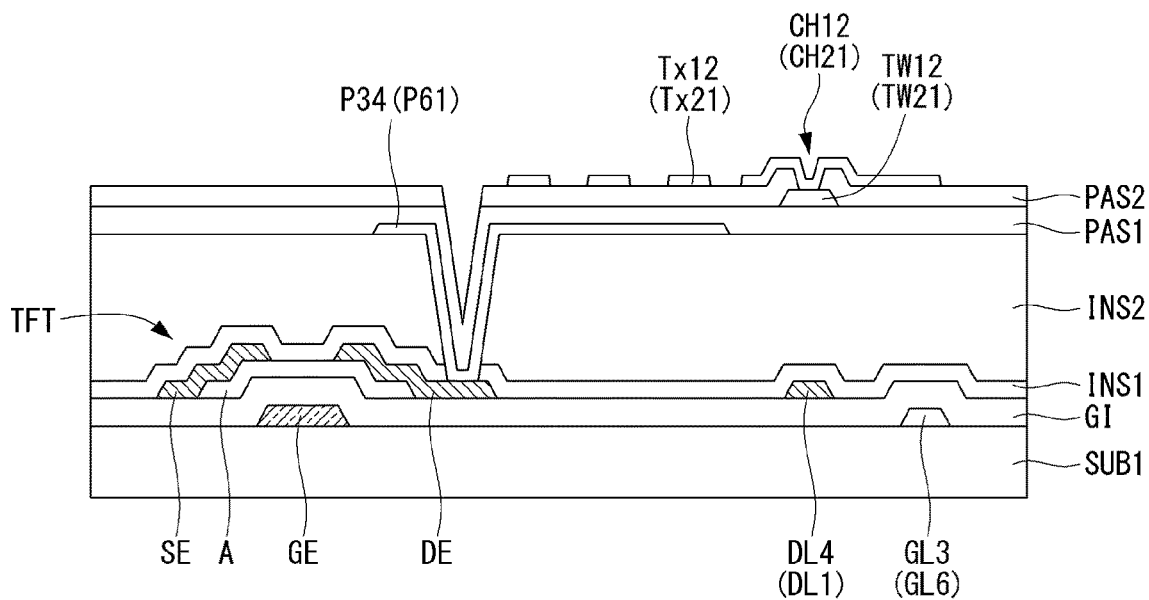
FIG. 9B is a cross-sectional view illustrating another example of a connection relationship between the another routing wires arranged in a second direction and the touch/common electrodes connected to the another routing wires in FIG. 8.

The example illustrated in FIGS. 8 to 9B is substantially the same as the example illustrated in FIGS. 6 to 7B, except the positions of the 1-1, the 1-2, the 2-1 and 2-2 routing wires, and the 1-1, the 1-2, the 2-1 and 2-2 touch/common electrodes, a connection relationship between the 1-1, the 1-2, the 2-1 and 2-2 routing wires and the 1-1, the 1-2, the 2-1 and 2-2 touch/common electrodes, and an absence of the third passivation layer PAS3. Accordingly, the example of the FIGS. 8 to 9B has an advantage of making the thickness to be thinner because it does not need the third passivation layer PAS3. In the following description, the example illustrated in FIGS. 8 to 9B will be described, focusing on the differences between the example illustrated in FIGS. 8 to 9B and the example illustrated in FIGS. 6 to 7B.

In the touch sensor integrated type display device according to the example of FIGS. 8 to 9B, the 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79, the 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78, the 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 and the 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are disposed on the second passivation PAS2. The 1-1 routing wires TW11, TW13, TW15, TW17, TW19; TW31, TW33, TW35, TW37, TW39; TW51, TW53, TW55, TW57, TW59; TW71, TW73, TW75, TW77, TW79, and the 2-2 routing wires TW22, TW24, TW26, TW28; TW42, TW44, TW46, TW48; TW62, TW64, TW66, TW68; TW82, TW84, TW86, TW88 are arranged in parallel in the first direction on the same layer as the gate lines GL, but are not overlapped with the gate lines GL. The 1-2 routing wires TW12, TW14, TW16, TW18; TW32, TW34, TW36, TW38; TW52, TW54, TW56, TW58; TW72, TW74, TW76, TW78 and the 2-1 routing wires TW21, TW23, TW25, TW27, TW29; TW41, TW43, TW45, TW47, TW49; TW61, TW63, TW65, TW67, TW69; TW81, TW83, TW85, TW87, TW89 are disposed on the first passivation layer PAS1.

The 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 are connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 disposed on the first substrate SUB1 via first contact holes CH11 passing through the gate insulation film GI, the first and second insulation layers INS1 and INS2, and the first and second passivation layers PAS1 and PAS2, as illustrated in FIGS. 5, 8 and 9A. The 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are connected to the 2-2 routing wires TW22, TW24, TW26, TW28; TW42, TW44, TW46, TW48; TW62, TW64, TW66, TW68; TW82, TW84, TW86, TW88 disposed on the first substrate SUB1 via second contact holes CH22 passing through the gate insulation film GI, the first and second insulation layers INS1 and INS2, and the first and second passivation layers PAS1 and PAS2, as illustrated in FIGS. 5, 8 and 9A.

The 1-2 routing wires TW12, TW14, TW16, TW18; TW32, TW34, TW36, TW38; TW52, TW54, TW56, TW58; TW72, TW74, TW76, TW78 and the 2-1 routing wires TW21, TW23, TW25, TW27, TW29; TW41, TW43, TW45, TW47, TW49; TW61, TW63, TW65, TW67, TW69; TW81, TW83, TW85, TW87, TW89 are disposed in parallel in the second direction on the first passivation layer PAS1, as illustrated in FIGS. 8 and 9B.

The 1-2 touch/common electrodes TW12, TW14, TW16, TW18; TW32, TW34, TW36, TW38; TW52, TW54, TW56, TW58; TW72, TW74, TW76, TW78 are connected to the 1-2 routing wires TW12, TW14, TW16, TW18; TW32, TW34, TW36, TW38; TW52, TW54, TW56, TW58; TW72, TW74, TW76, TW78 disposed on the first passivation layer PAS1 via third contact holes CH12 passing through the second passivation layer PAS2 (see FIGS. 5, 8 and 9B). The 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 are connected to the 2-1 routing wires TW21, TW23, TW25, TW27, TW29; TW41, TW43, TW45, TW47, TW49; TW61, TW63, TW65, TW67, TW69; TW81, TW83, TW85, TW87, TW89 disposed on the first passivation layer PAS1 via fourth contact holes CH21 passing through the second passivation layer PAS2, as illustrated in FIGS. 5, 8 and 9B.

Hereinafter, a touch sensor integrated type display device according to the second embodiment of the invention will be described with reference to FIG. 10.

Figure 10:
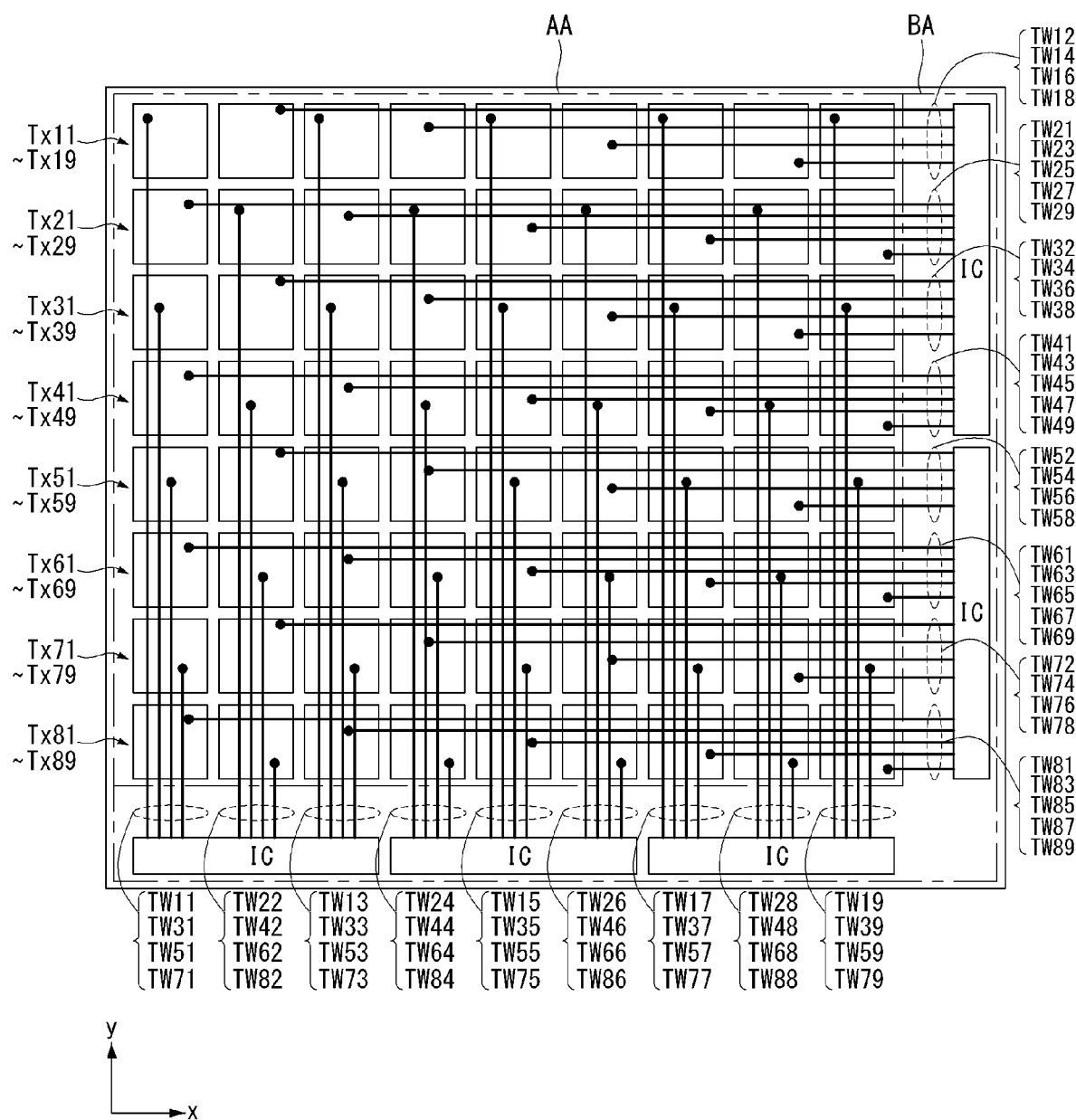
FIG. 10 is a planar view illustrating a relationship between touch/common electrodes and routing wires in a touch sensor integrated type display device according to the second embodiment of the invention.

FIG. 10 is a planar view illustrating a relationship between touch/common electrodes and routing wires in a touch sensor integrated type display device according to the second embodiment of the invention.

Referring to FIG. 10, the touch sensor integrated display device according to the second embodiment of the invention includes an active area AA and a bezel area BA outside the active area AA. The active area AA is an area in which touch/common electrodes are arranged and data are displayed. The bezel area BA is an area in which various wires including routing wires extended from the active area AA for driving and sensing touch/common electrodes and display/touch controller ICs for driving source drivers and gate drivers may be disposed.

The active area AA may include a plurality of touch/common electrodes Tx11 to Tx19, Tx21 to Tx29, Tx31 to Tx39, Tx41 to Tx49, Tx51 to Tx59, Tx61 to Tx69, Tx71 to Tx79, and Tx81 to Tx89. The plurality of touch/common electrodes Tx11 to Tx19, Tx21 to Tx29, Tx31 to Tx39, Tx41 to Tx49, Tx51 to Tx59, Tx61 to Tx69, Tx71 to Tx79, and Tx81 to Tx89 may be divided in a first direction (e.g., x-axis direction) and a second direction (e.g., y-axis direction) which cross each other.

The 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 disposed at the odd numbered rows of odd numbered columns among the plurality of touch/common electrodes are connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79 arranged in a second direction (e.g., y-axis direction), respectively. That is, the 1-1 touch/common electrodes Tx11, Tx13, Tx15, Tx17, Tx19; Tx31, Tx33, Tx35, Tx37, Tx39; Tx51, Tx53, Tx55, Tx57, Tx59; Tx71, Tx73, Tx75, Tx77, Tx79 are connected to the 1-1 routing wires TW11, TW13, TW15, TW17, TW19; TW31, TW33, TW35, TW37, TW39; TW51, TW53, TW55, TW57, TW59; TW71, TW73, TW75, TW77, TW79, respectively, on a one-to-one relationship.

The 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78 disposed at the odd numbered rows of even numbered columns among the plurality of touch/common electrodes are connected to 1-2 routing wires TW12, TW14, TW16, TW18; TW32, TW34, TW36, TW38; TW52, TW54, TW56, TW58; TW72, TW74, TW76, TW78 arranged in a first direction (e.g., x-axis direction), respectively. That is, the 1-2 touch/common electrodes Tx12, Tx14, Tx16, Tx18; Tx32, Tx34, Tx36, Tx38; Tx52, Tx54, Tx56, Tx58; Tx72, Tx74, Tx76, Tx78 are connected to 1-1 routing wires TW12, TW14, TW16, TW18; TW32, TW34, TW36, TW38; TW52, TW54, TW56, TW58; TW72, TW74, TW76, TW78, respectively, on a one-to-one relationship.

The 1-1 routing wires TW11, TW13, TW15, TW17, TW19; TW31, TW33, TW35, TW37, TW39; TW51, TW53, TW55, TW57, TW59; TW71, TW73, TW75, TW77, TW79 are arranged in parallel in the second direction, and 1-2 routing wires TW12, TW14, TW16, TW18; TW32, TW34, TW36, TW38; TW52, TW54, TW56, TW58; TW72, TW74, TW76, TW78 are arranged in parallel in the first direction.

The 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 disposed at the even numbered rows of odd numbered columns among the plurality of touch/common electrodes are connected to 2-1 routing wires TW21, TW23, TW25, TW27, TW29; TW41, TW43, TW45, TW47, TW49; TW61, TW63, TW65, TW67, TW69; TW81, TW83, TW85, TW87, TW89 arranged in the first direction (e.g., x-axis direction), respectively. That is, the 2-1 touch/common electrodes Tx21, Tx23, Tx25, Tx27, Tx29; Tx41, Tx43, Tx45, Tx47, Tx49; Tx61, Tx63, Tx65, Tx67, Tx69; Tx81, Tx83, Tx85, Tx87, Tx89 are connected to the 2-1 routing wires TW21, TW23, TW25, TW27, TW29; TW41, TW43, TW45, TW47, TW49; TW61, TW63, TW65, TW67, TW69; TW81, TW83, TW85, TW87, TW89, respectively, on a one-to-one relationship.

The 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 disposed at the even numbered rows of even numbered columns among the plurality of touch/common electrodes are connected to the 2-2 routing wires TW22, TW24, TW26, TW28; TW42, TW44, TW46, TW48; TW62, TW64, TW66, TW68; TW82, TW84, TW86, TW88 arranged in the second direction (e.g., y-axis direction), respectively. That is, the 2-2 touch/common electrodes Tx22, Tx24, Tx26, Tx28; Tx42, Tx44, Tx46, Tx48; Tx62, Tx64, Tx66, Tx68; Tx82, Tx84, Tx86, Tx88 are connected to the 2-2 routing wires TW22, TW24, TW26, TW28; TW42, TW44, TW46, TW48; TW62, TW64, TW66, TW68; TW82, TW84, TW86, TW88, respectively, on a one to-one relationship.

The 2-1 routing wires TW21, TW23, TW25, TW27, TW29; TW41, TW43, TW45, TW47, TW49; TW61, TW63, TW65, TW67, TW69; TW81, TW83, TW85, TW87, TW89 are arranged in parallel in the first direction, and the 2-2 routing wires TW22, TW24, TW26, TW28; TW42, TW44, TW46, TW48; TW62, TW64, TW66, TW68; TW82, TW84, TW86, TW88 are arranged in parallel in the second direction.

The touch sensor integrated type display device according to the second embodiment of the invention is substantially the same as the touch sensor integrated type display device according to the first embodiment of the invention, except for an arrangement of the routing wires. Accordingly, a detailed description for the connection relationship between the routing wires and the touch/common electrodes and the cross-sectional structures of the touch sensor integrated type according to the second embodiment of the invention will be omitted because they are substantially the same as the description related to FIGS. 6 to 9B.

Hereinafter, a touch sensor integrated type display device according to the third embodiment of the invention will be described with reference to FIG. 11.

Figure 11:
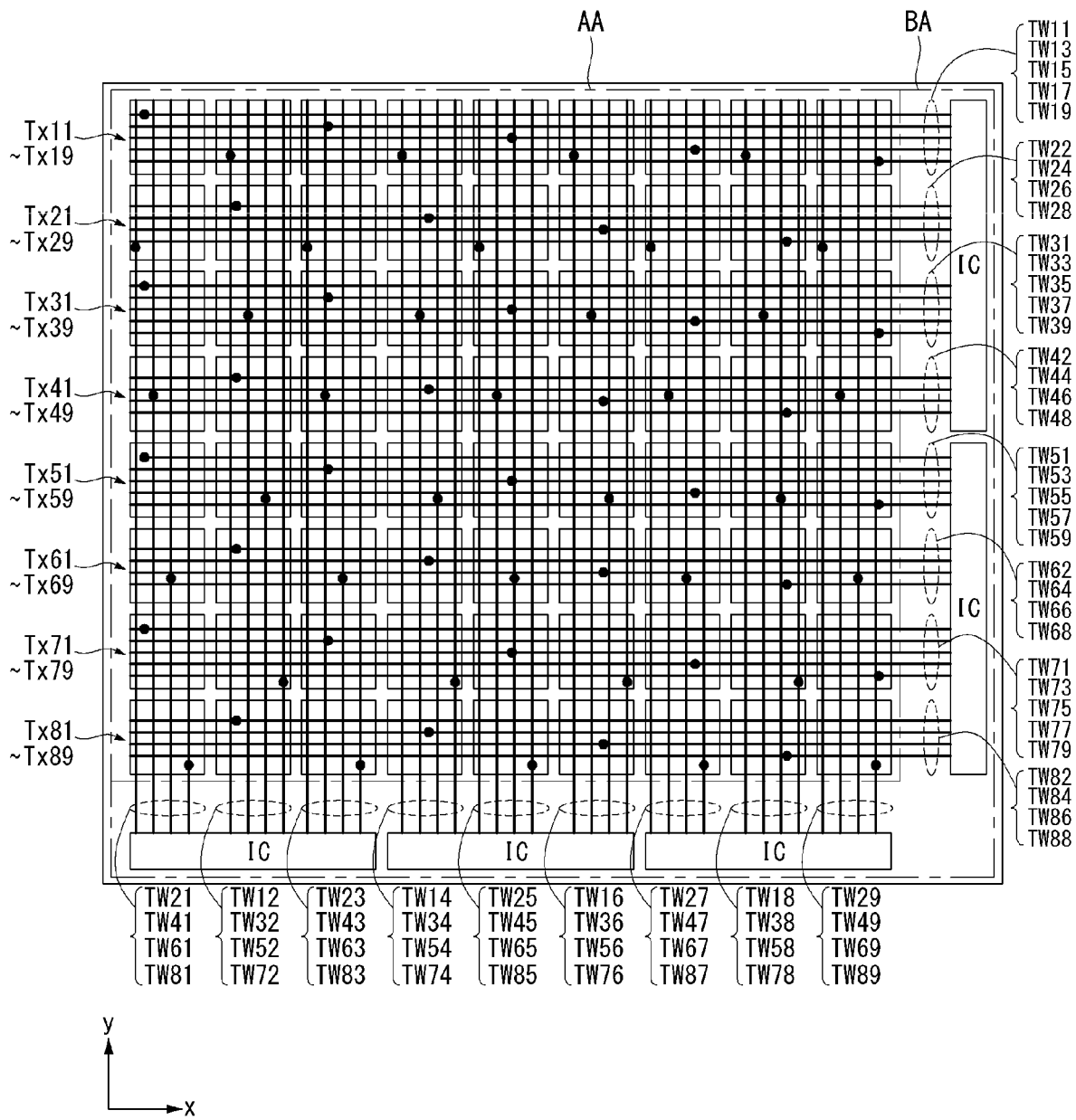
FIG. 11 is a planar view illustrating a relationship between touch/common electrodes and routing wires in a touch sensor integrated type display device according to the third embodiment of the invention.

FIG. 11 is a planar view illustrating a relationship between touch/common electrodes and routing wires in a touch sensor integrated type display device according to the third embodiment of the invention.

Referring to FIG. 11, the touch sensor integrated display device according to the third embodiment of the invention includes an active area AA and a bezel area BA outside the active area AA. The active area AA is an area in which touch/common electrodes Tx11 to Tx19, Tx21 to Tx29, Tx31 to Tx39, Tx41 to Tx49, Tx51 to Tx59, Tx61 to Tx69, Tx71 to Tx79, Tx81 to Tx89 and routing wires TW11 to TW19, TW21 to TW29, TW31 to TW39, TW41 to TW49, TW51 to TW59, TW61 to TW69, TW71 to TW79, TW81 to TW89 are arranged and data are displayed. The bezel area BA is an area in which various wires including routing wires extended from the active area AA for driving and sensing touch/common electrodes and drive ICs may be disposed.

The touch sensor integrated type display device according to the third embodiment of the invention is substantially the same as the touch sensor integrated type display device according to the first embodiment of the invention, except that lengths of the routing wires TW11, TW13, TW15, TW17, TW19; TW22, TW24, TW26, TW28; TW31, TW33, TW35, TW37, TW39; TW42, TW44, TW46, TW48; TW51, TW53, TW55, TW57, TW59; TW62, TW64, TW66, TW68; and TW71, TW73, TW75, TW77, TW79; TW82, TW84, TW86, TW88 arranged in the first direction are same as each other (in other words, all those routing wires have the same length), and lengths of the routing wires TW21, TW41, TW61, TW81; TW12, TW32, TW52, TW72; TW23, TW43, TW63, TW83; TW14, TW34, TW54, TW74; TW25, TW45, TW65, TW85; TW16, TW36, TW56, TW76; TW27, TW47, TW67, TW87; TW18, TW38, TW58, TW78; and TW29, TW49, TW69, TW89 arranged in the second direction are same as each other (in other words, all those routing wires have the same length).

Accordingly, a detailed description for the connection relationship between the routing wires and the touch/common electrodes and the cross-sectional structures of the touch sensor integrated type according to the third embodiment of the invention will be omitted because they are substantially the same as the description related to FIGS. 6 to 9B.

According to the touch sensor integrated type display device according to the third embodiment of the invention, it is possible to remove deviation of parasitic capacitance due to difference in length of routing wires because the lengths of the routing wires arranged in the first direction are same as each other, and lengths of the routing wires arranged in the second direction are same as each other. Therefore, it is possible to enhance touch accuracy.

Hereinafter, a touch sensor integrated type display device according to the fourth embodiment of the invention will be described with reference to FIG. 12.

Figure 12:
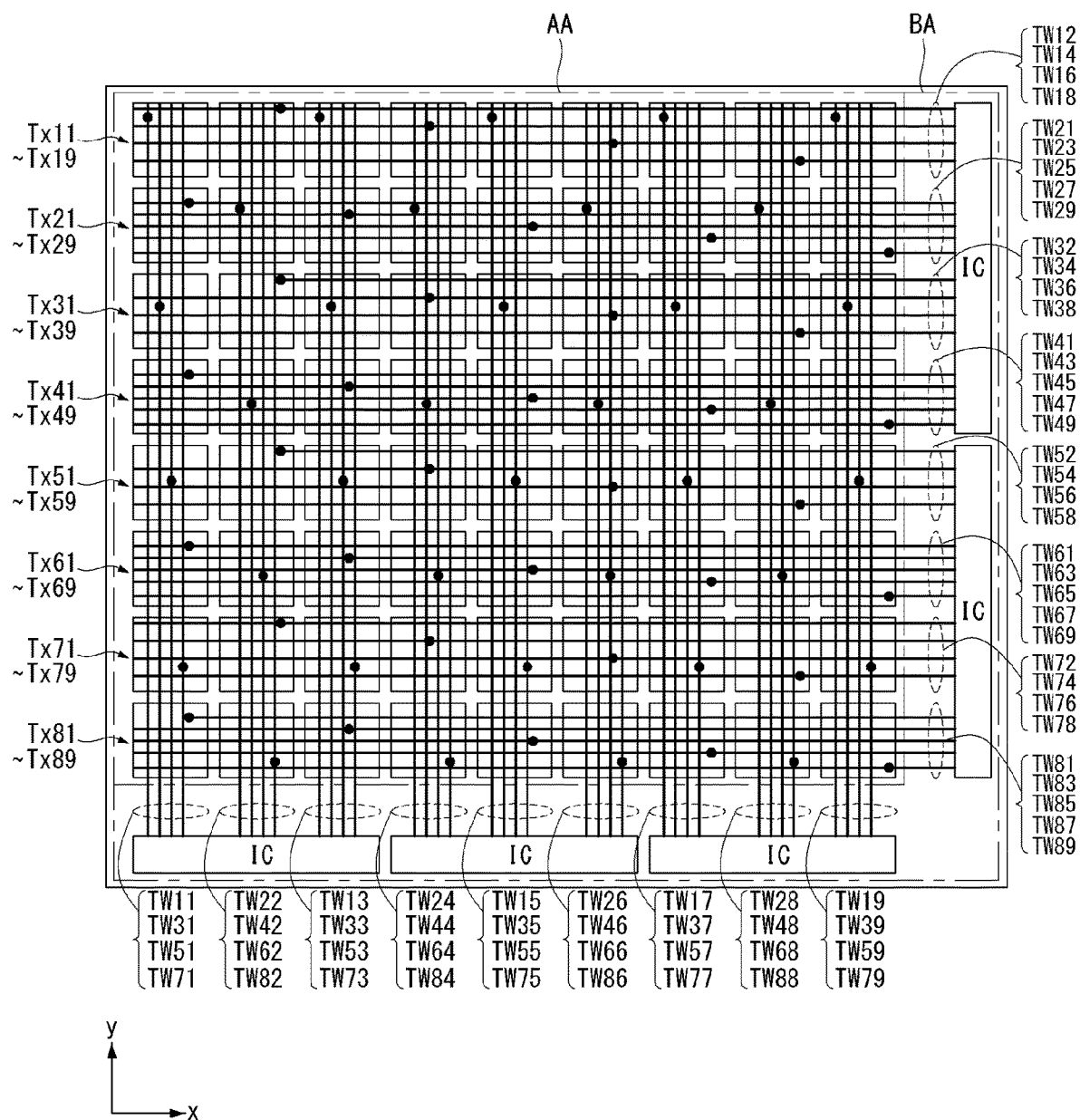
FIG. 12 is a planar view illustrating a relationship between touch/common electrodes and routing wires in a touch sensor integrated type display device according to the fourth embodiment of the invention.

FIG. 12 is a planar view illustrating a relationship between touch/common electrodes and routing wires in a touch sensor integrated type display device according to the fourth embodiment of the invention.

Referring to FIG. 12, the touch sensor integrated display device according to the fourth embodiment of the invention includes an active area AA and a bezel area BA outside the active area AA. The active area AA is an area in which touch/common electrodes Tx11 to Tx19, Tx21 to Tx29, Tx31 to Tx39, Tx41 to Tx49, Tx51 to Tx59, Tx61 to Tx69, Tx71 to Tx79, Tx81 to Tx89 and routing wires TW11 to TW19, TW21 to TW29, TW31 to TW39, TW41 to TW49, TW51 to TW59, TW61 to TW69, TW71 to TW79, TW81 to TW89 are arranged and data are displayed. The bezel area BA is an area in which various wires including routing wires extended from the active area AA for driving and sensing touch/common electrodes and drive ICs may be disposed.

The touch sensor integrated type display device according to the fourth embodiment of the invention is substantially the same as the touch sensor integrated type display device according to the second embodiment of the invention, except that lengths of the routing wires TW12, TW14, TW16, TW18; TW21, TW23, TW25, TW27, TW29; TW32, TW34, TW36, TW38; TW41, TW43, TW45, TW47, TW49; TW52, TW54, TW56, TW58; TW61, TW63, TW65, TW67, TW69; TW72, TW74, TW76, TW78; TW81, TW83, TW85, TW87, TW89 arranged in the first direction are same as each other (in other words, all those routing wires have the same length), and lengths of the routing wires TW11, TW31, TW51, TW71; TW22, TW42, TW62, TW82; TW13, TW33, TW53, TW73; TW24, TW44, TW64, TW84; TW15, TW35, TW55, TW75; TW26, TW46, TW66, TW86; TW17, TW37, TW57, TW77; TW28, TW48, TW68, TW88; and TW19, TW39, TW59, TW79 arranged in the second direction are same as each other (in other words, all those routing wires have the same length).

Accordingly, a detailed description for the connection relationship between the routing wires and the touch/common electrodes and the cross-sectional structures of the touch sensor integrated type according to the second embodiment of the invention will be omitted because they are substantially the same as the description related to FIGS. 6 to 9B.

According to the touch sensor integrated type display device according to the fourth embodiment of the invention, it is possible to remove deviation of parasitic capacitance due to length difference of routing wires because lengths of the routing wires arranged in the first direction are same as each other, and lengths of the routing wires arranged in the second direction are same as each other. Therefore, it is possible to enhance touch accuracy.

Hereinafter, a touch sensor integrated type display device according to the fifth embodiment of the invention will be described with reference to FIG. 13.

Figure 13:
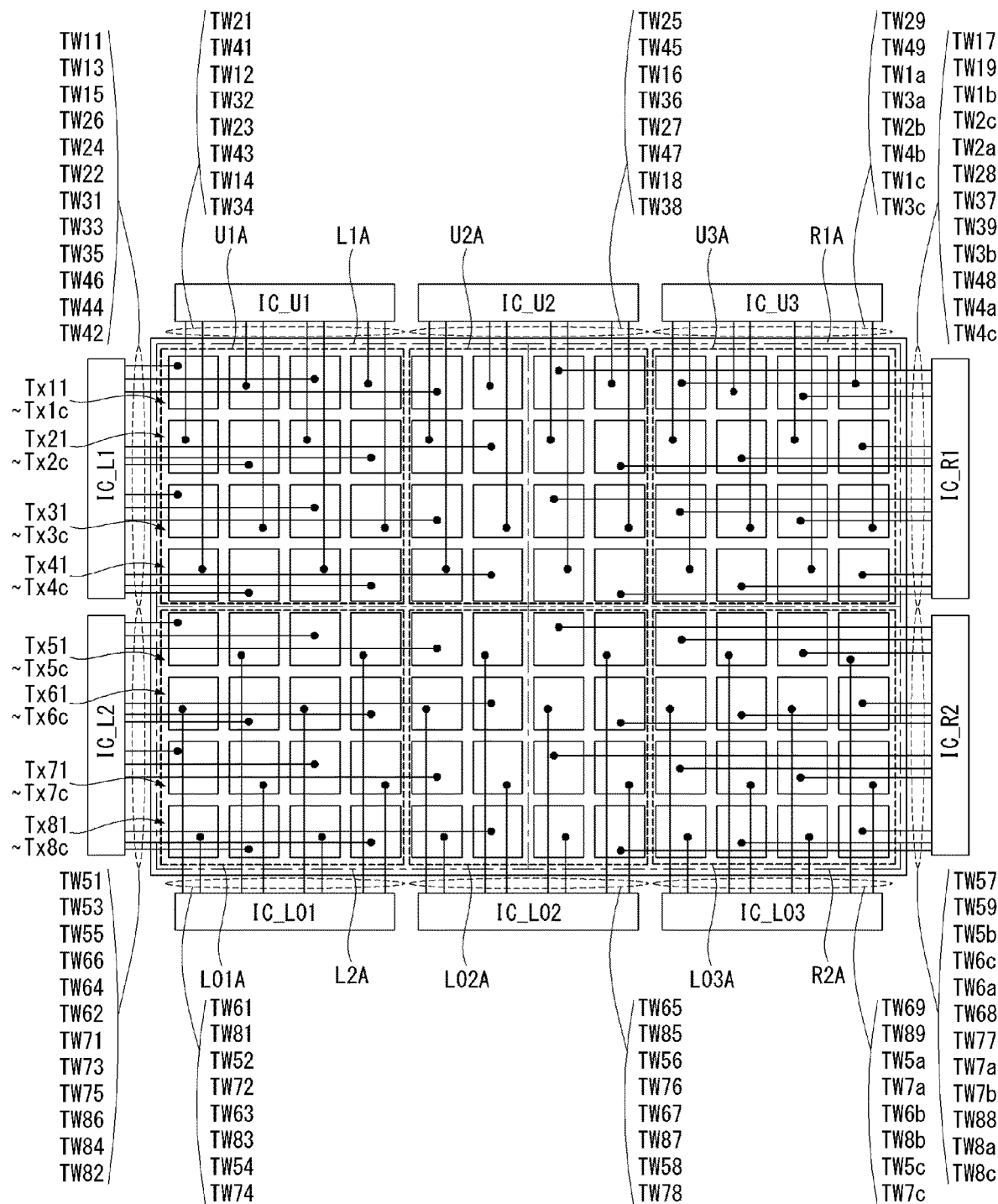
FIG. 13 is a planar view illustrating a relationship between touch/common electrodes and routing wires in a touch sensor integrated type display device according to the fifth embodiment of the invention.

FIG. 13 is a planar view illustrating a relationship between touch/common electrodes and routing wires in a touch sensor integrated type display device according to the fifth embodiment of the invention.

Referring to FIG. 13, the touch sensor integrated display device according to the fifth embodiment of the invention includes an active area AA and a bezel area BA outside the active area AA. The active area AA is an area in which touch/common electrodes Tx11 to Tx1c, Tx21 to Tx2c, Tx31 to Tx3c, Tx41 to Tx4c, Tx51 to Tx5c, Tx61 to Tx6c, Tx71 to Tx7c, and Tx81 to Tx8c and routing wires TW11 to TW1c, TW21 to TW2c, TW31 to TW3c, TW41 to TW4c, TW51 to TW5c, TW61 to TW6c, TW71 to TW7c, and TW81 to TW8c are arranged and data are displayed. The bezel area BA is an area in which various wires including routing wires extended from the active area AA for driving and sensing touch/common electrodes and drive ICs may be disposed.

The touch sensor integrated type display device according to the fifth embodiment of the invention is substantially the same as the touch sensor integrated type display device according to the first embodiment of the invention, except that drive ICs IC_L1, IC_L2, IC_R1, IC_R2, IC_U1, IC_U2, IC_U3, IC_LO1, IC_LO2, and IC_LO3 are disposed at left, right, upper and lower sides of the active area AA and the drive ICs IC_L1, IC_L2, IC_R1, IC_R2, IC_U1, IC_U2, IC_U3, IC_LO1, IC_LO2, and IC_LO3 drive and sense touch/common electrodes Tx11, Tx13, Tx15, Tx22, Tx24, Tx26, Tx31, Tx33, Tx35, Tx42, Tx44, Tx46; Tx51, Tx53, Tx55, Tx62, Tx64, Tx66, Tx71, Tx73, Tx75, Tx82, Tx84, Tx86; Tx17, Tx19, Tx1$b$, Tx28, Tx2$a$, Tx2$c$, Tx37, Tx39, Tx3$b$, Tx48, Tx4$a$, Tx4$c$; Tx57, Tx59, Tx5$b$, Tx68, Tx6$a$, Tx6$c$, Tx77, Tx79, Tx7$b$, Tx88, Tx8$a$, Tx8$c$; Tx21, Tx41, Tx12, Tx32, Tx23, Tx43, Tx14, Tx34; Tx25, Tx45, Tx16, Tx36, Tx27, Tx47, Tx18, Tx38; Tx29, Tx49, Tx1$a$, Tx3$a$, Tx2$b$, Tx4$b$, Tx1$c$, Tx3$c$; Tx61, Tx81, Tx52, Tx72, Tx63, Tx83, Tx54, Tx74; and Tx65, Tx85, Tx56, Tx76, Tx67, Tx87, Tx58, Tx78; Tx69, Tx89, Tx5$a$, Tx7$a$, Tx6$b$, Tx8b, Tx5c, Tx7c disposed in predetermined areas L1A, L2A, R1A, R2A, U1A, U2A, U3A, LO1A, LO2A, and LO3A of the active area AA.

Accordingly, a detailed description for the connection relationship between the routing wires and the touch/common electrodes and the cross-sectional structures of the touch sensor integrated type according to the fifth embodiment of the invention will be omitted because they are substantially the same as the description related to FIGS. 6 to 9B.

Hereinafter, the touch sensor integrated type display device according to the fifth embodiment of the invention different from the construction of the first embodiment will be described.

The active area AA of the touch sensor integrated display device according to the fifth embodiment of the invention includes first to tenth areas L1A, L2A, R1A, R2A, U1A, U2A, U3A, LO1A, LO2A, and LO3A corresponding to first to tenth drive ICs IC_L1, IC_L2, IC_R1, IC_R2, ICU1, IC_U2, IC_U3, IC_LO1, IC_LO2, and IC_LO3. The first to fourth areas L1A, L2A, R1A and R2A overlap the fifth to tenth areas U1A, U2A, U3A, LO1A, LO2A, and LO3A. First to tenth touch/common electrodes Tx11, Tx13, Tx15, Tx22, Tx24, Tx26, Tx31, Tx33, Tx35, Tx42, Tx44, Tx46; Tx51, Tx53, Tx55, Tx62, Tx64, Tx66, Tx71, Tx73, Tx75, Tx82, Tx84, Tx86; Tx17, Tx19, Tx1b, Tx28, Tx2a, Tx2c, Tx37, Tx39, Tx3b, Tx48, Tx4a, Tx4c; Tx57, Tx59, Tx5b, Tx68, Tx6a, Tx6c, Tx77, Tx79, Tx7b, Tx88, Tx8a, Tx8c; Tx21, Tx41, Tx12, Tx32, Tx23, Tx43, Tx14, Tx34; Tx25, Tx45, Tx16, Tx36, Tx27, Tx47, Tx18, Tx38; Tx29, Tx49, Tx1a, Tx3a, Tx2b, Tx4b, Tx1c, Tx3c; Tx61, Tx81, Tx52, Tx72, Tx63, Tx83, Tx54, Tx74; Tx65, Tx85, Tx56, Tx76, Tx67, Tx87, Tx58, Tx78; and Tx69, Tx89, Tx5a, Tx7a, Tx6b, Tx8b, Tx5c, Tx7c are respectively disposed in the first to tenth areas L1A, L2A, R1A, R2A, U1A, U2A, U3A, LO1A, LO2A and LO3A.

The first touch/common electrodes Tx11, Tx13, Tx15, Tx22, Tx24, Tx26, Tx31, Tx33, Tx35, Tx42, Tx44 and Tx46 disposed in the first area L1A are connected to the first drive IC IC_L1 disposed at a left side of the active area AA via first routing wires TW11, TW13, TW15, TW22, TW24, TW26, TW31, TW33, TW35, TW42, TW44 and TW46 arranged in a first direction.

The second touch/common electrodes Tx51, Tx53, Tx55, Tx62, Tx64, Tx66, Tx71, Tx73, Tx75, Tx82, Tx84 and Tx86 disposed in the second area L2A are connected to the second drive IC IC_L2 disposed at the left side of the active area AA via second routing wires TW51, TW53, TW55, TW62, TW64, TW66, TW71, TW73, TW75, TW82, TW84 and TW86 arranged in the first direction.

The third touch/common electrodes Tx17, Tx19, Tx1b, Tx28, Tx2a, Tx2c, Tx37, Tx39, Tx3b, Tx48, Tx4a and Tx4c disposed in the third area R1A are connected to the third drive IC IC_R1 disposed at a right side of the active area AA via third routing wires TW17, TW19, TW1b, TW28, TW2a, TW2c, TW37, TW39, TW3b, TW48, TW4a and TW4c arranged in a third direction which is a reverse direction of the first direction.

The fourth touch/common electrodes Tx57, Tx59, Tx5b, Tx68, Tx6a, Tx6c, Tx77, Tx79, Tx7b, Tx88, Tx8a and Tx8c disposed in the fourth area R2A are connected to the fourth drive IC IC_R2 disposed at the right side of the active area AA via fourth routing wires TW17, TW19, TW1b, TW28, TW2a, TW2c, TW37, TW39, TW3b, TW48, TW4a and TW4c arranged in the third direction.

The fifth area U1A overlaps a portion of the first area L1A. The fifth touch/common electrodes Tx21, Tx41, Tx12, Tx32, Tx23, Tx43, Tx14 and Tx34 disposed in the fifth area U1A are connected to the fifth drive IC U1 disposed at an upper side of the active area AA via fifth routing wires TW21, TW41, TW12, TW32, TW23, TW43, TW14 and TW34 arranged in a second direction.

The sixth area U2A overlaps a portion of the first area L1A and a portion of the third area R1A. The sixth touch/common electrodes Tx25, Tx45, Tx16, Tx36, Tx27, Tx47, Tx18 and Tx38 disposed in the sixth area U2A are connected to the sixth drive IC U2 disposed at the upper side of the active area AA via sixth routing wires TW25, TW45, TW16, TW36, TW27, TW47, TW18 and TW38 arranged in the second direction.

The seventh area U3A overlaps a portion of the third area R1A. The seventh touch/common electrodes Tx29, Tx49, Tx1a, Tx3a, Tx2b, Tx4b, Tx1c and Tx3c disposed in the seventh area U3A are connected to the seventh drive IC U3 disposed at the upper side of the active area AA via seventh routing wires TW29, TW49, TW1a, TW3a, TW2b, TW4b, TW1c and TW3c arranged in the second direction.

The eighth area LO1A overlaps a portion of the second area L2A. The eighth touch/common electrodes Tx61, Tx81, Tx52, Tx72, Tx63, Tx83, Tx54 and Tx74 disposed in the eighth area LO1A are connected to the eighth drive IC LO1 disposed at a lower side of the active area AA via eighth routing wires TW61, TW81, TW52, TW72, TW63, TW83, TW54 and TW74 arranged in a fourth direction which is a reverse direction of the second direction.

The ninth area LO2A overlaps a portion of the second area L2A and a portion of the fourth area R2A. The ninth touch/common electrodes Tx65, Tx85, Tx56, Tx76, Tx67, Tx87, Tx58 and Tx78 disposed in the ninth area LO2A are connected to the ninth drive IC LO1 disposed at the lower side of the active area AA via ninth routing wires TW65, TW85, TW56, TW76, TW67, TW87, TW58 and TW78 arranged in the fourth direction.

The tenth area LO3A overlaps a portion of the fourth area R2A. The tenth touch/common electrodes Tx69, Tx89, Tx5a, Tx7a, Tx6b, Tx8b, Tx5c and Tx7c disposed in the tenth area LO3A are connected to the tenth drive IC LO3 disposed at the lower side of the active area AA via tenth routing wires TW69, TW89, TW5a, TW7a, TW6b, TW8b, TW5c and TW7c arranged in the fourth direction.

In the touch sensor integrated type display device according to the fifth embodiment of the invention, the first to fourth touch/common electrodes Tx11, Tx13, Tx15, Tx22, Tx24, Tx26, Tx31, Tx33, Tx35, Tx42, Tx44, Tx46; Tx51, Tx53, Tx55, Tx62, Tx64, Tx66, Tx71, Tx73, Tx75, Tx82, Tx84, Tx86; Tx17, Tx19, Tx1b, Tx28, Tx2a, Tx2c, Tx37, Tx39, Tx3b, Tx48, Tx4a, Tx4c; and Tx57, Tx59, Tx5b, Tx68, Tx6a, Tx6c, Tx77, Tx79, Tx7b, Tx88, Tx8a, Tx8c disposed in the first to fourth areas L1A, L2a, R1A and R2a are respectively connected to the first to fourth drive ICs IC_L1, IC_L2, IC_R1 and IC_R2 via first to fourth routing wires TW11, TW13, TW15, TW22, TW24, TW26, TW31, TW33, TW35, TW42, TW44, TW46; TW51, TW53, TW55, TW62, TW64, TW66, TW71, TW73, TW75, TW82, TW84, TW86; TW17, TW19, TW1b, TW28, TW2a, TW2c, TW37, TW39, TW3b, TW48, TW4a, TW4c; and TW57, TW59, TW5b, TW68, TW6a, TW6c, TW77, TW79, TW7b, TW88, TW8a, TW8c arranged in the first direction. The fifth to tenth touch/common electrodes Tx21, Tx41, Tx12, Tx32, Tx23, Tx43, Tx14, Tx34; Tx25, Tx45, Tx16, Tx36, Tx27, Tx47, Tx18, Tx38; Tx29, Tx49, Tx1a, Tx3a, Tx2b, Tx4b, Tx1c, Tx3c; Tx61, Tx81, Tx52, Tx72, Tx63, Tx83, Tx54, Tx74; Tx65, Tx85, Tx56, Tx76, Tx67, Tx87, Tx58, Tx78; and Tx69, Tx89, Tx5a, Tx7a, Tx6b, Tx8b, Tx5c, Tx7c disposed in the fifth to tenth areas U1A, U2A, U3A, LO1A, LO2A and LO3A are respectively connected to the first to fourth drive ICs IC_U1, IC_U2, IC_U3, IC_LO1, IC_LO2 and IC_LO3 via fifth to tenth routing wires TW21, TW41, TW12, TW32, TW23, TW43, TW14, TW34; TW25, TW45, TW16, TW36, TW27, TW47, TW18, TW38; TW29, TW49, TW1a, TW3a, TW2b, TW4b, TW1c, TW3c; TW61, TW81, TW52, TW72, TW63, TW83, TW54, TW74; TW65, TW85, TW56, TW76, TW67, TW87, TW58, TW78; and TW69, TW89, TW5a, TW7a, TW6b, TW8b, TW5c, TW7c arranged in the second direction.

According to the touch sensor integrated type display device of the fifth embodiment of the invention, it is possible to reduce a number of the routing wires disposed at one side to one half in comparison to the touch sensor integrated type display device of the first to fourth embodiments because the touch/common electrodes disposed in the active area AA are connected to the drive ICs disposed at the left, right, upper and lower sides of the active area AA. Accordingly, the touch sensor integrated type display device of the fifth embodiment of the invention can be applied to a large screen display.

Hereinafter, a touch sensor integrated type display device according to the sixth embodiment of the invention will be described with reference to FIG. 14.

Figure 14:
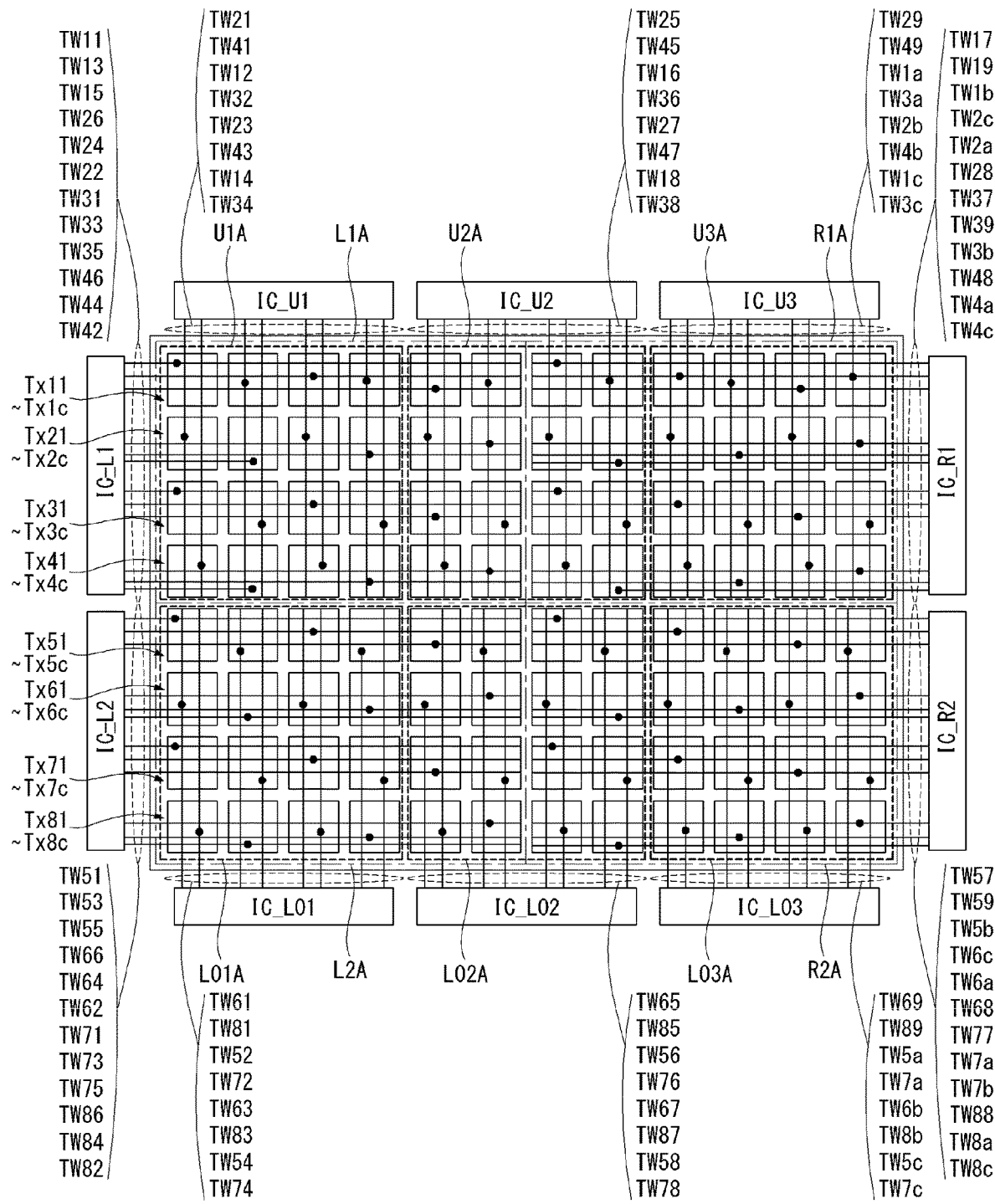
FIG. 14 is a planar view illustrating a relationship between touch/common electrodes and routing wires in a touch sensor integrated type display device according to the sixth embodiment of the invention.

FIG. 14 is a planar view illustrating a relationship between touch/common electrodes and routing wires in a touch sensor integrated type display device according to the sixth embodiment of the invention.

Referring to FIG. 14, the touch sensor integrated display device according to the sixth embodiment of the invention includes an active area AA and a bezel area BA outside the active area AA. The active area AA is an area in which touch/common electrodes Tx11 to Tx1c, Tx21 to Tx2c, Tx31 to Tx3c, Tx41 to Tx4c, Tx51 to Tx5c, Tx61 to Tx6c, Tx71 to Tx7c, and Tx81 to Tx8c and routing wires TW11 to TW1c, TW21 to TW2c, TW31 to TW3c, TW41 to TW4c, TW51 to TW5c, TW61 to TW6c, TW71 to TW7c, and TW81 to TW8c are arranged and data are displayed. The bezel area BA is an area in which various wires including routing wires extended from the active area AA for driving and sensing touch/common electrodes and drive ICs may be disposed.

The touch sensor integrated type display device according to the sixth embodiment of the invention is substantially the same as the touch sensor integrated type display device according to the fifth embodiment of the invention, except that lengths of the routing wires disposed in a same direction are same as each other.

More specifically, lengths of the first routing wires TW11, TW13, TW15, TW22, TW24, TW26, TW31, TW33, TW35, TW42, TW44 and TW46 disposed in the first direction in the first area L1A are same as each other.

Lengths of the second routing wires TW51, TW53, TW55, TW62, TW64, TW66, TW71, TW73, TW75, TW82, TW84 and TW86 disposed in the first direction in the second area L2A are same as each other.

Lengths of the third routing wires TW17, TW19, TW1b, TW28, TW2a, TW2c, TW37, TW39, TW3b, TW48, TW4a and TW4c disposed in the third direction in the third area R1A are same as each other.

Lengths of the fourth routing wires TW57, TW59, TW5b, TW68, TW6a, TW6c, TW77, TW79, TW7b, TW88, TW8a and TW8c disposed in the third direction in the third area R2A are same as each other.

Lengths of the fifth routing wires TW21, TW41, TW12, TW32, TW23, TW43, TW14 and TW34 disposed in the second direction in the fifth area U1A are same as each other.

Lengths of the sixth routing wires TW25, TW45, TW16, TW36, TW27, TW47, TW18 and TW38 disposed in the second direction in the sixth area U2A are same as each other.

Lengths of the seventh routing wires TW29, TW49, TW1a, TW3a, TW2b, TW4b, TW1c and TW3c disposed in the second direction in the seventh area U3A are same as each other.

Lengths of the eighth routing wires TW61, TW81, TW52, TW72, TW63, TW83, TW54 and TW74 disposed in the fourth direction in the eighth area LO1A are same as each other.

Lengths of the ninth routing wires TW65, TW85, TW56, TW76, TW67, TW87, TW58 and TW78 disposed in the fourth direction in the ninth area LO2A are same as each other.

Lengths of the tenth routing wires TW69, TW89, TW5a, TW7a, TW6b, TW8b, TW5c and TW7c disposed in the fourth direction in the ninth area LO3A are same as each other.

Accordingly, a detailed description for the connection relationship between the routing wires and the touch/common electrodes and the cross-sectional structures of the touch sensor integrated type according to the sixth embodiment of the invention will be omitted because they are substantially the same as the description related to FIGS. 6 to 9B.

According to the touch sensor integrated type display device according to the sixth embodiment of the invention, it is possible to remove deviation of parasitic capacitance due to length difference of routing wires because lengths of the routing wires arranged in a same direction are same as each other. Therefore, it is possible to enhance touch accuracy in comparison to the touch sensor integrated type display device according to the fifth embodiment of the invention.

The touch sensor integrated type display devices according to the fifth and sixth embodiments of the invention shown in FIGS. 13 and 14 illustrate that the active area AA includes the first to fourth areas L1A, L2A, R1A and R2A for the first to fourth drive ICs IC_L1, IC_L2, IC_R1 and ICR2 disposed at the left and right sides of the active area AA and the fifth to tenth areas U1A, U2A, U3A, LO1A, LO2A, and LO3A for the fifth to tenth drive ICs IC_U1, IC_U2, IC_U3, IC_LO1, IC_LO2 and IC_LO3 disposed at the upper and lower sides of the active area AA, and each size of the first to fourth areas L1A, L2A, R1A and R2A is different from that of the fifth to tenth areas U1A, U2A, U3A, LO1A, LO2A, and LO3A. However, the invention is not limited thereto. The size or number of the areas for the drive ICs disposed at the left, right, upper and lower sides of the active area AA may be adjusted as necessary.

Hereinafter, operations of the touch sensor integrated type display devices according to the first to sixth embodiments of the invention will be described with reference to FIG. 15.

Figure 15:
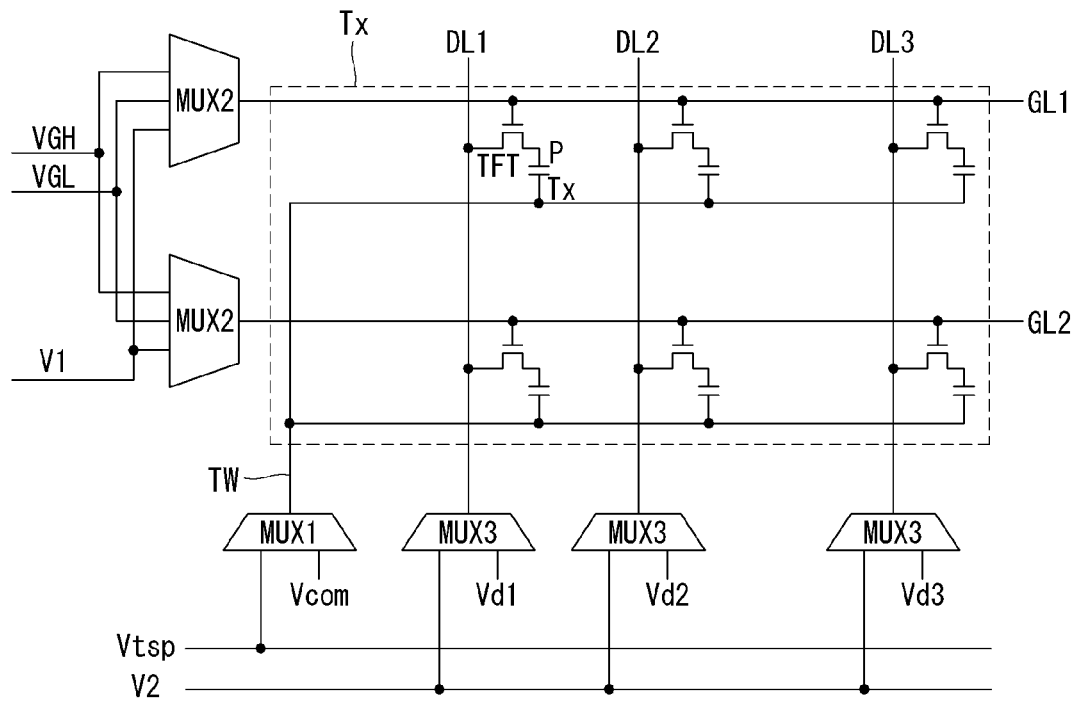
FIG. 15 is a timing diagram showing a display operation period at a display mode and a touch operation period at a touch mode for the touch sensor integrated type display devices according to the first to sixth embodiments of the invention.
Figure 15:
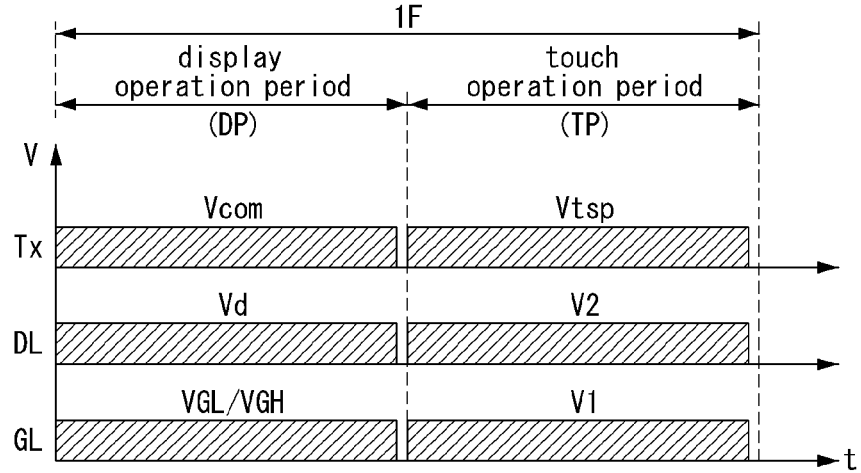

FIG. 15 is a timing diagram showing a display operation period at a display mode and a touch operation period at a touch mode for the touch sensor integrated type display devices according to the first and sixth embodiments of the invention.

FIG. 15 shows only the area corresponding to one touch/common electrode in order to simplify and clarify the description of the invention Referring to FIG. 15, the touch sensor integrated type display devices according to the first to sixth embodiments of the invention are operated in a time-division in which one frame period is time-divided into a display operation period DP and a touch operation period TP.

Alternatively, the touch sensor integrated type display devices according to the first to sixth embodiments of the invention may be operated in a time-division in which one frame period is time-divided into a plurality of display operation periods and a plurality of touch operation period which are alternating.

Each drive IC supplies a common voltage Vcom to the touch/common electrode Tx during a display operation period of one frame period 1F, and a touch driving voltage Vtsp to the touch/common electrode Tx during a touch operation period of the one frame period 1F.

During the display operation period, a gate high voltage VGH or a gate low voltage VGL is sequentially supplied to the gate lines GL1 and GL2 by the gate driver (not shown). Also data voltages Vd1, Vd2 and Vd3 are supplied to the data lines DL1, DL2 and DL3 by the source driver (not shown) or the driver IC, thereby displaying an image on the active area AA. The data voltages Vd1, Vd2 and Vd3 may be supplied to the data lines DL1, DL2 and DL3 by the driver IC.

During the touch operation period, a first voltage V1 is supplied to all of the gate lines GL1 and GL2. The first voltage V1 has a phase and amplitude same as that of the touch operation voltage Vtsp. Also, a second voltage V2 is supplied to all of the data lines DL1, DL2 and DL3. The second voltage V2 has a phase and amplitude same as that of the touch operation voltage Vtsp.

More specifically, the drive IC supplies the common voltage Vcom to the touch/common electrodes Tx via a first multiplexer MUX1 during the display operation period. At this time, the gate high voltage VGH is sequentially supplied to the gate lines GL1 and GL2 via second multiplexers MUX2. The gate low voltage VGL is supplied to the gate lines to which the gate high voltage VGH is not supplied. The data voltages Vd1 to Vd3 are supplied to the data lines DL1 to DL3 respectively, via third multiplexers MUX3.

The drive IC supplies the touch driving voltage Vtsp to all of the touch/common electrodes Tx via the first multiplexer MUX1 during the touch operation period TP. At this time, the first voltage V1 is supplied to all of the gate lines GL1 and GL2 via the second multiplexers MUX2. The first voltage V1 has a phase and amplitude same as that of the touch driving voltage Vtsp. Also, the second voltage V2 is supplied to all of the data lines DL1 to DL2 via the third multiplexers MUX3. The second voltage V2 has a phase and amplitude same as that of the touch driving voltage Vtsp.

Herein, the first and second voltages V1 and V2 may include the following voltage values.
(1) Voltage having a phase same as that of the touch driving voltage Vtsp and an amplitude in which a maximum value and a minimum value of the amplitude are same as those of the touch driving voltage Vtsp
(2) Voltage having a phase same as that of the touch driving voltage Vtsp and an amplitude in which the difference between a maximum value and a minimum value of the amplitude is same as the difference between a maximum value and a minimum value of the amplitude of the touch driving voltage Vtsp The first to third multiplexers MUX1 to MUX3 may be integrated into the display panel, or integrated into a source PCB (not shown) on which the drive IC is mounted.

In the touch sensor integrated type display devices according to the first to sixth embodiments of the invention, there are less parasitic capacitances between the routing wires and the gate lines GL and/or the routing wires and the data lines DL because the first voltage V1 and/or the second voltage V2 having the phase and amplitude same to those of the touch driving voltage Vtsp supplied to the touch/common electrodes Tx are also supplied to the gate lines GL or data lines DL. As a result, it may be possible to reduce reduction of touch sensibility due to the parasitic capacitances.

Also, it may be possible to reduce reduction of touch sensibility due to enlargement of the touch/common electrode and/or some touch/common electrodes which are not connected to any routing wires because the routing wires are arranged in, for example, both directions that are crossing each other.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display device integrated with a touch sensor comprising:
   a plurality of gate lines and a plurality data lines crossing each other;
   a plurality of pixel electrodes;
   a plurality of touch/common electrodes;
   a first group of routing wires connected to a first subset of the touch/common electrodes and arranged in a first direction from the first subset of the touch/common electrodes;
   a second group of routing wires connected to a second subset of the touch/common electrodes and arranged in a second direction from the second subset of the touch/common electrodes;
   a third group of routing wires connected to a third subset of the touch/common electrodes and arranged in a third direction from the third subset of the touch/common electrodes; and
   a fourth group of routing wires connected to a fourth subset of the touch/common electrodes and arranged in the second direction from the fourth subset of the touch/common electrodes,
   wherein at least one of the routing wires from the first group of routing wires crosses over at least one of the routing wires from the second group of routing wires in an active area, and
   wherein at least one of the routing wires from the third group of routing wires crosses over at least one of the routing wires from the fourth group of routing wires in the active area.

2. The display device of claim 1, further comprising:
   a first drive IC connected to drive the first group of routing wires;
   a second drive IC connected to drive the second group of routing wires;
   a third drive IC connected to the drive third group of routing wires; and
   a fourth drive IC connected to the drive fourth group of routing wires.

3. The display device of claim 2, wherein the first drive IC is configured to supply a common voltage to the first subset of the touch/common electrodes during a display operation period of one frame period, and supply a touch driving voltage to the first subset of the touch/common electrodes during a touch operation period of the one frame period, the second drive IC is configured to supply the common voltage to the second subset of the touch/common electrodes during the display operation period, and supply the touch driving voltage to the second subset of the touch/common electrodes during the touch operation period, the third drive IC is configured to supply the common voltage to the third subset of the touch/common electrodes during the display operation period, and supply the touch driving voltage to the third subset of the touch/common electrodes during the touch operation period, the fourth drive IC is configured to supply the common voltage to the fourth subset of the touch/common electrodes during the display operation period, and supply the touch driving voltage to the fourth subset of the touch/common electrodes during the touch operation period, and the display device is configured to, during the touch operation period, supply a first voltage having a phase and an amplitude same as the phase and the voltage, respectively, of the touch driving voltage to the gate lines and supply a second voltage having a phase and an amplitude same as the phase and the voltage, respectively, of the touch driving voltage to the data lines.

4. The display device of claim 1, further comprising:
a fifth group of routing wires connected to a fifth subset of the touch/common electrodes and arranged in the first direction from the fifth subset of the touch/common electrodes;
a sixth group of routing wires connected to a sixth subset of the touch/common electrodes and arranged in a fourth direction from the sixth subset of the touch/common electrodes;
a seventh group of routing wires connected to a seventh subset of the touch/common electrodes and arranged in the third direction from the seventh subset of the touch/common electrodes; and
an eighth group of routing wires connected to an eighth subset of the touch/common electrodes and arranged in the fourth direction from the eighth subset of the touch/common electrodes.

5. The display device of claim 4, wherein lengths of the first group of routing wires are the same, lengths of the second group of routing wires are the same, lengths of the third group of routing wires are the same, lengths of the fourth group of routing wires are the same, lengths of the fifth group of routing wires are the same, lengths of the sixth group of routing wires are the same, lengths of the seventh group of routing wires are the same, and lengths of the eighth group of routing wires are the same.

6. The display device of claim 4, wherein the first and third directions are the same as an arrangement direction of the gate lines, and the second and the fourth directions are the same as an arrangement direction of the data lines.

7. The display device of claim 4, wherein the first and third directions are the same as an arrangement direction of the data lines, and the second and the fourth directions are the same as an arrangement direction of the gate lines.

8. The display device of claim 4, further comprising:
a first drive IC connected to drive the first group of routing wires;
a second drive IC connected to drive the second group of routing wires;
a third drive IC connected to drive the third group of routing wires;
a fourth drive IC connected to drive the fourth group of routing wires;
a fifth drive IC connected to drive the fifth group of routing wires;
a sixth drive IC connected to drive the sixth group of routing wires;
a seventh drive IC connected to drive the seventh group of routing wires; and
an eighth drive IC connected to drive the eighth group of routing wires.

9. The display device of claim 8, wherein the first drive IC is configured to supply a common voltage to the first subset of the touch/common electrodes during a display operation period of one frame period, and supply a touch driving voltage to the first subset of the touch/common electrodes during a touch operation period of the one frame period, the second drive IC is configured to supply the common voltage to the second subset of the touch/common electrodes during the display operation period, and supply the touch driving voltage to the second subset of the touch/common electrodes during the touch operation period, the third drive IC is configured to supply the common voltage to the third subset of the touch/common electrodes during the display operation period, and supply a touch driving voltage to the third subset of the touch/common electrodes during the touch operation period, the fourth drive IC is configured to supply the common voltage to the fourth subset of the touch/common electrodes during the display operation period, and supply the touch driving voltage to the fourth subset of the touch/common electrodes during the touch operation period, the fifth drive IC is configured to supply a common voltage to the fifth subset of the touch/common electrodes during the display operation period, and supply the touch driving voltage to the fifth subset of the touch/common electrodes during the touch operation period, the sixth drive IC is configured to supply the common voltage to the sixth subset of the touch/common electrodes during the display operation period, and supply the touch driving voltage to the sixth subset of the touch/common electrodes during the touch operation period, the seventh drive IC is configured to supply the common voltage to the seventh subset of the touch/common electrodes during the display operation period, and supply the touch driving voltage to the seventh subset of the touch/common electrodes during the touch operation period, the eighth drive IC is configured to supply the common voltage to the eighth subset of the touch/common electrodes during the display operation period, and supply the touch driving voltage to the eighth subset of the touch/common electrodes during the touch operation period, and the display device is configured to, during the touch operation period, supply a first voltage having a phase and an amplitude same as the phase and the amplitude, respectively, of the touch driving voltage to the gate lines and supply a second voltage having a phase and an amplitude same as the phase and the amplitude, respectively, of the touch driving voltage to the data lines.

* * * * *